(12) United States Patent
Kalwei et al.

(10) Patent No.: US 9,616,384 B2
(45) Date of Patent: Apr. 11, 2017

(54) BASE METAL CATALYST

(71) Applicant: BASF SE, Ludwigshafen (DE)

(72) Inventors: Martin Kalwei, Hannover (DE); Edgar V. Huennekes, Wunstorf (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/604,026

(22) Filed: Jan. 23, 2015

(65) Prior Publication Data

US 2015/0360178 A1  Dec. 17, 2015

Related U.S. Application Data

(60) Provisional application No. 62/010,697, filed on Jun. 11, 2014.

(51) Int. Cl.
*B01J 29/72* (2006.01)
*B01J 29/76* (2006.01)
(Continued)

(52) U.S. Cl.
CPC ....... *B01D 53/9477* (2013.01); *B01D 53/944* (2013.01); *B01J 21/063* (2013.01); *B01J 23/02* (2013.01); *B01J 23/16* (2013.01); *B01J 23/22* (2013.01); *B01J 23/30* (2013.01); *B01J 23/42* (2013.01); *B01J 23/70* (2013.01); *B01J 29/06* (2013.01); *B01J 35/0006* (2013.01); *F01N 3/103* (2013.01); *B01D 53/9463* (2013.01); *B01D 2251/208* (2013.01); *B01D 2255/1021* (2013.01); *B01D 2255/20707* (2013.01);
(Continued)

(58) Field of Classification Search
CPC .. B01D 53/9418; B01D 46/0061; B01J 23/00; B01J 29/723; B01J 29/7207; F01N 3/023; F01N 3/2066
See application file for complete search history.

(56) References Cited

U.S. PATENT DOCUMENTS 3,111,396 A  11/1963 Ball
4,329,162 A   5/1982 Pitcher, Jr.
(Continued)

FOREIGN PATENT DOCUMENTS

CN  101439262  5/2009
CN  101530787  9/2009
(Continued)

OTHER PUBLICATIONS

PCT International Search Report and Written Opinion in PCT/IB2015/000904, mailed Oct. 9, 2015, 13 Pages.
(Continued)

*Primary Examiner* — Timothy Vanoy
(74) *Attorney, Agent, or Firm* — Oblon, McClelland, Maier & Neustadt, L.L.P.

(57) ABSTRACT

Described are base metal catalysts that comprise a base metal material in an amount effective to generate an exotherm over a temperature range of 300° C. to 650° C. and to oxidize soot collected by a downstream particulate filter. The base metal catalysts are substantially free of platinum group metals. Emission treatment systems and methods of remediating nitrogen oxides ($NO_x$), particulate matter, and gaseous hydrocarbons using base metal catalyst are also described.

32 Claims, 13 Drawing Sheets

(51) Int. Cl.
*B01J 23/00* (2006.01)
*B01D 46/00* (2006.01)
*B01D 53/94* (2006.01)
*F01N 3/023* (2006.01)
*F01N 3/20* (2006.01)
*B01J 23/02* (2006.01)
*B01J 23/16* (2006.01)
*B01J 23/30* (2006.01)
*B01J 23/70* (2006.01)
*F01N 3/10* (2006.01)
*B01J 21/06* (2006.01)
*B01J 23/22* (2006.01)
*B01J 23/42* (2006.01)
*B01J 29/06* (2006.01)
*B01J 35/00* (2006.01)

(52) U.S. Cl.
CPC .............. *B01D 2255/20723* (2013.01); *B01D 2255/20776* (2013.01); *B01D 2255/50* (2013.01); *B01D 2255/65* (2013.01)

(56) References Cited

U.S. PATENT DOCUMENTS

| | | | |
|---|---|---|---|
| 4,961,917 | A | 10/1990 | Byrne |
| 4,963,332 | A | 10/1990 | Brand et al. |
| 5,300,472 | A | 4/1994 | Brand et al. |
| 5,462,907 | A | 10/1995 | Farrauto et al. |
| 5,491,120 | A | 2/1996 | Voss et al. |
| 5,516,497 | A | 5/1996 | Speronello et al. |
| 5,522,218 | A | 6/1996 | Lane et al. |
| 6,077,600 | A | 6/2000 | Atmur et al. |
| 6,193,942 | B1 | 2/2001 | Okuda et al. |
| 6,352,955 | B1 | 3/2002 | Golden |
| 6,372,686 | B1 | 4/2002 | Golden |
| 6,415,602 | B1 | 7/2002 | Patchett et al. |
| 6,823,663 | B2 | 11/2004 | Hammerle et al. |
| 7,264,785 | B2 | 9/2007 | Blakeman |
| 7,601,306 | B2 | 10/2009 | Sakurai |
| 7,601,662 | B2 * | 10/2009 | Bull .................. B01D 53/9418 423/700 |
| 8,006,485 | B2 | 8/2011 | Twigg et al. |
| 8,057,767 | B1 | 11/2011 | Qi et al. |
| 8,187,548 | B2 | 5/2012 | Yamada et al. |
| 8,268,273 | B2 | 9/2012 | Doring |
| 8,404,011 | B2 | 3/2013 | Doring et al. |
| 9,145,809 | B2 * | 9/2015 | Boorse .................. F01N 3/106 |
| 2001/0038812 | A1 | 11/2001 | Yavuz et al. |
| 2005/0069476 | A1 | 3/2005 | Blakeman et al. |
| 2005/0282698 | A1 | 12/2005 | Southward et al. |
| 2006/0245985 | A1 | 11/2006 | Harada et al. |
| 2008/0202107 | A1 * | 8/2008 | Boorse .............. B01D 53/9418 60/301 |
| 2009/0260346 | A1 | 10/2009 | Gekas et al. |
| 2010/0247411 | A1 | 9/2010 | Larcher et al. |
| 2012/0036834 | A1 | 2/2012 | Qi et al. |
| 2012/0328500 | A1 | 12/2012 | Larcher et al. |
| 2013/0232953 | A1 | 9/2013 | Harmsen et al. |

FOREIGN PATENT DOCUMENTS

| | | |
|---|---|---|
| DE | 10-2007-001129 | 7/2008 |
| DE | 10-2009-002182 | 9/2010 |
| DE | 102011109200 | 2/2012 |
| DE | 102012218475 | 4/2013 |
| EP | 0585795 | 3/1994 |
| EP | 0600442 | 6/1994 |
| EP | 2042227 | 1/2009 |
| EP | 2363195 | 9/2011 |
| FR | 2907445 | 4/2008 |
| FR | 2933488 | 1/2010 |
| WO | WO-2009/120866 | 10/2009 |
| WO | WO-2010/075345 | 7/2010 |
| WO | WO-2013/044115 | 3/2013 |

OTHER PUBLICATIONS

Fuel Oil, *Wikipedia*, http://en.wikipedia.org/wiki/Fuel_oil, accessed from the Internet Jan. 23, 2015, 10 pages.

Aluha, James Lulizi, et al., Palladium-Based Catalysts with Improved Sulphur Tolerance for Diesel-Engine Exhaust Systems, *Top Catal.* vol. 52 2009, 1977-1982.

Kanno, Y., et al., Low Sulfate Generation Diesel Oxidation Catalyst, *SAE International, Technical Paper 2004-01-1427* Mar. 8, 2004, Abstract, 1 page.

Mayer, A., et al., DPF Systems for High Sulfur Fuels, *SAE International, Technical Paper 2011-01-0605* Apr. 12, 2011, Abstract, 1 page.

Peiyan, Lin, et al., Development of Non-noble Metal Catalysts for the Purification of Automotive Exhaust Gas, *Studies in Surface Science and Catalysis* vol. 30 1987, 395-403, Abstract, 2 pages.

Sim, Ji Sun, et al., Preliminary performance studies of Al—Co—Mn mixed oxide and Ag-doping for the purpose of PGM-free DOC, *Applied Catalysis A: General*, vol. 480 Jun. 20, 2014, 120-127, Abstract, 3 pages.

Verdier, S., et al., Doped Zirconia with High Thermal Stability, for High Sulfur Resistance Diesel Oxidation Catalysts, *SAE International, Technical Paper 2006-01-0031* Apr. 3, 2006, Abstract, 1 page.

Voss, K., et al., Performance Characteristics of a Novel Diesel Oxidation Catalyst, *SAE International, Technical Paper 940239* Mar. 3, 1994, Abstract, 1 page.

* cited by examiner

BASE METAL CATALYST

CROSS-REFERENCE TO RELATED APPLICATIONS

This application claims priority to Provisional Application Ser. No. 62/010,697, filed Jun. 11, 2014, the contents of which are hereby incorporated by reference in their entireties.

TECHNICAL FIELD

The present invention relates to base metal catalysts, emission treatment systems and methods. More specifically, embodiments are directed to catalysts, systems and methods having a base metal catalyst positioned upstream from a particulate filter and a selective catalytic reduction (SCR) catalyst. In systems in which hydrocarbons (e.g. fuel) are periodically injected upstream of the base metal catalyst, the base metal catalyst generates an exotherm over a temperature range of 300° C. to 650° C. to regenerate the downstream particulate filter which has collected soot.

BACKGROUND

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter, and a catalyst for the reduction of $NO_x$.

Oxidation catalysts that contain platinum group metals are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO, and particulate matter, oxidation catalysts that contain platinum group metals (which are typically dispersed on a refractory oxide support) also promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel and oil. Small proportions of $SO_3$ are formed during combustion of the diesel fuel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions when oxygen is used for the carbon oxidation. This temperature is higher than what is typically present in diesel exhaust. However, another mechanism for the soot oxidation is its reaction with $NO_2$, which takes place with sufficient rates of reaction in the temperature interval between 250 and 500° C. The reason for the upper boundary temperature is the thermodynamic equilibrium between NO and $NO_2$ in the presence of oxygen, which results in low $NO_2$ concentrations by increasing temperature.

Active regeneration processes are normally initiated by altering the engine management to raise temperatures in front of the filter up to 500 to 630° C. for an oxygen based soot oxidation and up to 300 to 500° C. for an $NO_2$ based soot oxidation. Depending on driving mode, high exotherms can occur inside the filter when the cooling during regeneration is not sufficient (low speed/low load or idle driving mode). Such exotherms may exceed 800° C. or more within the filter. One common way that has been developed to accomplish active regeneration is the introduction of a combustible material (e.g., diesel fuel) into the exhaust and burning it across a flow-through diesel oxidation catalyst (DOC) mounted up-stream of the filter. The exotherm from this auxiliary combustion provides the sensible heat (e.g. about 300-700° C.) needed to burn soot from the filter in an acceptable period of time (e.g. about 2-120 minutes).

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way a catalyzed soot filter (CSF) or catalyzed diesel particulate filter (CDPF) is effective in providing for >80% particulate matter reduction along with passive burning of the accumulating soot, and thereby promoting filter regeneration.

Future emissions standards adopted throughout the world will also address $NO_x$ reductions from diesel exhaust. A proven $NO_x$ abatement technology applied to stationary sources with lean exhaust conditions is Selective Catalytic Reduction (SCR). In this process, $NO_x$ is reduced with ammonia ($NH_3$) to nitrogen ($N_2$) over a catalyst typically composed of base metals. The technology is capable of $NO_x$ reduction greater than 90%, and thus it represents one of the best approaches for achieving aggressive $NO_x$ reduction goals. SCR is under development for mobile applications, with urea (typically present in an aqueous solution) as the source of ammonia. SCR provides efficient conversions of $NO_x$ as long as the exhaust temperature is within the active temperature range of the catalyst, the operating window.

New emission regulations for diesel engines around the world are forcing the use of more advanced emission controls systems. These systems will need to reduce both total particulate matter and $NO_x$ by about 95 percent. The engine manufacturers have multiple emission system options to meet the new regulations but one option is the combination of an active filter system for particulate reduction and a selective catalytic reduction system.

One system configuration that has been proposed in the literature involves a diesel oxidation catalyst (DOC) positioned downstream from the engine, a catalyzed soot filter (CSF) positioned downstream from the DOC, a reductant injection system position downstream from the CSF, a selective catalytic reduction (SCR) catalyst positioned downstream from the reductant injection system, and an optional ammonia oxidation (AMOX) catalyst positioned downstream from the SCR catalyst. The system also typically includes a hydrocarbon injection system located downstream from the engine and upstream from the DOC.

This system configuration offers several advantages for the overall system functionality. Having the DOC in the first position allows it to be placed as close as possible to the engine ensuring rapid heat up for cold start HC and CO emissions and the maximum DOC inlet temperature for active filter regeneration. The CSF being in front of the SCR will prevent particulate, oil ash and other undesirable materials from being deposited on the SCR catalyst thus improving its durability and performance. Having platinum group metal oxidation catalysts in front of the SCR allows for an increase in the $NO_2$ to NO (or $NO_2$ to $NO_x$ ratio entering the SCR which is known to increase the reaction rate of the $NO_x$ reduction occurring in the SCR if properly controlled. An example of such a system is described in U.S. Pat. No. 7,264,785.

This system configuration, however, also is problematic because the DOC often comprises platinum group metals (PGM) dispersed on a refractory metal oxide support. Due to the large amounts of PGM used, these catalysts are relatively expensive. Additionally, in fuel with high sulfur content, such as the fuel in developing and emerging countries, the sulfur reacts to form $SO_3$, which acts a poison to the DOC. The activity of the DOC is, thus, negatively impacted, and filter regeneration cannot be sustained in sufficient forms.

Accordingly, there is an ongoing need to investigate and provide alternative system strategies to improve the treatment of exhaust gas streams containing $NO_x$ and particulate matter, especially for fuels containing high sulfur concentrations.

SUMMARY

A first aspect of the invention pertains to a base metal catalyst. In a first embodiment, a base metal catalyst for abatement of exhaust gas emissions from a lean burn engine comprises a base metal material in an amount effective to generate an exotherm over a temperature range of 300° C. to 650° C. and to oxidize soot collected by a downstream particulate filter, wherein the base metal catalyst is substantially free of platinum group metals.

In a second embodiment, the base metal catalyst of the first embodiment is modified, wherein the exhaust gas emissions comprise sulfur.

In a third embodiment, the base metal catalyst of the first and second embodiments is modified, wherein the base metal material is selected from V, W, Ti, Cu, Fe, Co, Ni, Cr, Mn, Nd, Ba, Ce, La, Pr, Mg, Ca, Zn, Nb, Zr, Mo, Sn, Ta, Ce, and Sr, and combinations thereof.

In a fourth embodiment, the base metal catalyst of the first through third embodiments is modified, wherein the base metal material comprises one or more of V, W, Fe, Ce, Cu, and Ti.

In a fifth embodiment, the base metal catalyst of the first through fourth embodiments is modified, further comprising a molecular sieve material.

In a sixth embodiment, the base metal catalyst of the fifth embodiment is modified, wherein the molecular sieve material has a framework of silicon, aluminum, and/or phosphorus atoms.

In a seventh embodiment, the base metal catalyst of the fifth and sixth embodiments is modified, wherein the molecular sieve material comprises ring sizes of no larger than 12.

In an eighth embodiment, the base metal catalyst of the fifth through seventh embodiments is modified, wherein the molecular sieve material comprises a d6r unit.

In a ninth embodiment, the base metal catalyst of the fifth through eighth embodiments is modified, wherein the molecular sieve material is selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a tenth embodiment, the base metal catalyst of the fifth through ninth embodiments is modified, wherein the molecular sieve material is selected from AEI, CHA, AFX, ERI, KFI, LEV, and combinations thereof.

In an eleventh embodiment, the base metal catalyst of the fifth through tenth embodiments is modified, wherein the molecular sieve material is selected from AEI, CHA, and AFX.

In a twelfth embodiment, the base metal catalyst of the fifth through eleventh embodiments is modified, wherein the molecular sieve material comprises a d6r unit, and the base metal material is selected from Cu, Fe, and combinations thereof.

In a thirteenth embodiment, the base metal catalyst of the fifth through eleventh embodiments is modified, wherein the molecular sieve material comprises CHA and the base metal material is selected from Cu, Fe, and combinations thereof.

In a fourteenth embodiment, the base metal catalyst of the first through thirteenth embodiments is modified, wherein the base metal catalyst is dispersed on a refractory metal oxide support.

In a fifteenth embodiment, the base metal catalyst of the fourteenth embodiment is modified, wherein the base metal catalyst is in a configuration selected from uniform, zoned, or layered.

A second aspect of the present invention is directed to a system for treatment of a lean burn engine exhaust gas stream. In a sixteenth embodiment, a system for treatment of a lean burn engine exhaust gas stream including hydrocarbons, carbon monoxide, and other exhaust components, the system comprises an exhaust conduit in fluid communication with the lean burn engine via an exhaust manifold; the base metal catalyst of the first through fifteenth embodiments disposed on a carrier substrate; and a particulate filter and a first SCR catalyst located downstream from the base metal catalyst.

In a seventeenth embodiment, the system of the sixteenth embodiment is modified, wherein a second SCR catalyst is coated onto the particulate filter and located downstream from the base metal catalyst.

In an eighteenth embodiment, the system of the sixteenth and seventeenth embodiments is modified, wherein the system further comprises a platinum group metal oxidation catalyst downstream of the base metal catalyst and upstream of the particulate filter.

In a nineteenth embodiment, the system of the sixteenth through eighteenth embodiments is modified, wherein the base metal catalyst and the platinum group metal oxidation catalyst are located on a single substrate.

In a twentieth embodiment, the system of the sixteenth through nineteenth embodiments is modified, wherein the base metal catalyst and the platinum group metal oxidation catalyst are located on separate substrates.

In a twenty-first embodiment, the system of the sixteenth through twentieth embodiments is modified, wherein the base metal catalyst and the platinum group metal are layered on the substrate.

In a twenty-second embodiment, the system of the sixteenth through twenty-first embodiments is modified, wherein the base metal catalyst and the platinum group metal are axially zoned on the substrate.

In a twenty-third embodiment, the system of the sixteenth through twenty-second embodiments is modified wherein the platinum group metal (PGM) oxidation catalyst comprises an ammonia oxidation catalyst, and wherein the system further comprises a reductant injector downstream of the engine and upstream of the base metal catalyst.

In a twenty-fourth embodiment, the system of the sixteenth through twenty-third embodiments is modified, further comprising a reductant injector downstream of the particulate filter.

In a twenty-fifth embodiment, the system of the sixteenth through twenty-fourth embodiments is modified, wherein fuel is injected upstream of the base metal catalyst and the fuel comprises sulfur.

In a twenty-sixth embodiment, the system of the twenty-fifth embodiment is embodiment is modified, wherein the fuel comprises less than 10 ppm sulfur.

In a twenty-seventh embodiment, the system of the twenty-fifth embodiment is modified, wherein the fuel comprises greater than 10 ppm sulfur.

In a twenty-eighth embodiment, the system of the sixteenth through twenty-seventh embodiments is modified, wherein there is no platinum group metal oxidation catalyst upstream from the base metal catalyst or upstream from the SCR catalyst.

In a twenty-ninth embodiment, the system of the sixteenth through twenty-eighth embodiments is modified, further comprising an ammonia oxidation catalyst downstream from the particulate filter and the first SCR catalyst.

A third aspect of the present invention is directed to a method of treating an exhaust stream. In a thirtieth embodiment, a method of treating an exhaust stream from a diesel engine comprising $NO_x$ and particulate matter, comprises flowing the exhaust stream through the catalyst of the first through fifteenth embodiments.

DETAILED DESCRIPTION

Figure 1:
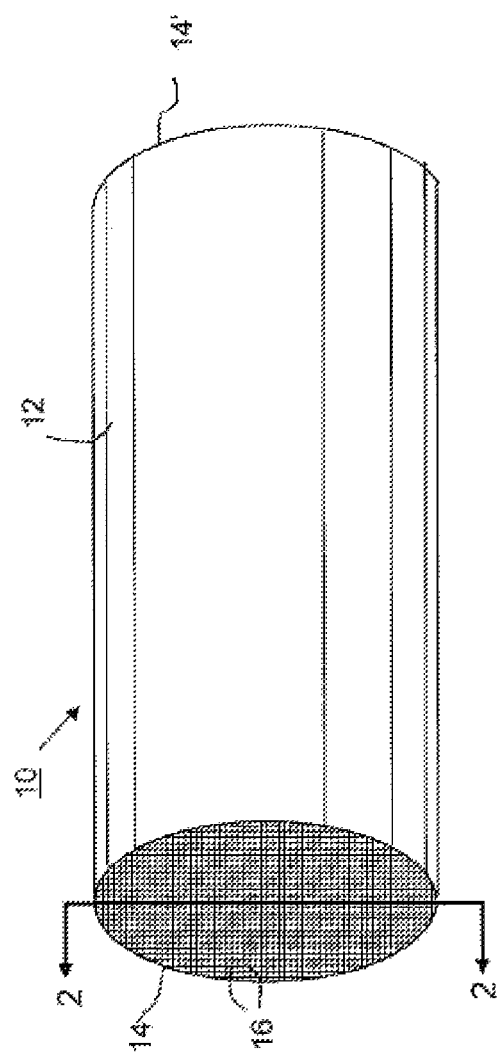
FIG. 1 shows a perspective view of a flow through honeycomb substrate.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

To meet future emission regulations around the world, it will be necessary to utilize particulate reduction and $NO_x$ reduction emission control systems. One approach is the utilization of an active particulate filter system plus a selective catalytic reduction system. This system can be configured in numerous ways but a configuration in the following order—Diesel Platinum group metal oxidation catalyst (DOC)—Catalyzed Soot Filter (CSF)—Urea Injection—Selective Catalytic Reduction Catalyst (SCR)—with or without an Ammonia Oxidation Catalyst (AMOX) seems to offer attractive design benefits. However, in situations where fuel has a high sulfur content, the sulfur can poison traditional DOCs and regeneration of the CSF cannot be sustained in sufficient form. Accordingly, a catalyst is desired which is not poisoned even when operating with fuel containing high sulfur concentrations.

Embodiments of the invention are directed to a base metal catalyst that is substantially free of platinum group metal, which can be used upstream of a particulate filter and SCR catalyst to oxidize hydrocarbons, even in fuel that has a high sulfur content. The base metal catalyst of one or more embodiments is designed to burn fuel for active regeneration of the filter by fuel injection either in-cylinder in the engine or post injection in the exhaust with minimal or no $NO_2$ production across the base metal catalyst such that $NO_2$ out has negligible or no effect on particulate oxidation in the particulate filter. In other words, the base metal catalyst of one or more embodiments is designed to burn soot collected by a downstream particulate filter with no appreciable NO oxidation activity of the base metal catalyst. The downstream particulate filter can be designed to optimize the $NO/NO_2$ ratio out of the filter to facilitate optimal $NO_x$ reduction across the SCR system and to provide $NO_2$ necessary for the soot oxidation within the filter.

With respect to the terms used in this disclosure, the following definitions are provided.

As used herein, the term "catalyst" or "catalyst composition" or "catalyst material" refers to a material that promotes a reaction.

As used herein, the term "selective catalytic reduction" (SCR) refers to the catalytic process of reducing oxides of nitrogen to dinitrogen ($N_2$) using a nitrogenous reductant.

As used herein, the term "activated alumina" has its usual meaning of a high BET surface area alumina, comprising one or more of gamma-, theta- and delta aluminas.

As used herein, the term "BET surface area" has its usual meaning of referring to the Brunauer, Emmett, Teller method for determining surface area by $N_2$ absorption. Unless otherwise specifically stated, all references herein to the surface area of the catalyst support components or other catalyst components means the BET surface area.

As used herein, the term "bulk form," when used to describe the physical form of a material (e.g., ceria), means the material is present as discrete particles that can be as small as 1 to 15 microns in diameter or smaller, as opposed to having been dispersed in solution onto another material such as gamma alumina. By way of example, in some embodiments of the invention, particles of ceria are admixed with particles of gamma alumina so that ceria is present in bulk form, as opposed to, for example, impregnating alumina particles with aqueous solutions of ceria precursors which upon calcination are converted to ceria disposed on the alumina particles.

When present in a catalyst, "cerium component" means one or more oxides of cerium (e.g., $CeO_2$).

As used herein, the terms "downstream" and "upstream," when used to describe an article, catalyst substrate or zone, refer to the relative positions in the exhaust system as sensed in the direction of the flow of the exhaust gas stream. When a catalyst or catalyst zone is "downstream" or "upstream" from another catalyst or zone, it may be on a different substrate or brick or on a different region of the same substrate or brick.

As used herein, the term "high surface area support" refers to support materials with a BET surface area that is approximately greater than 10 $m^2/g$, for example, greater than 150 $m^2/g$.

As used herein, the terms "platinum group metal" or "PGM" refer to the platinum group metals or oxides thereof. Platinum group metals include platinum, palladium, rhodium, osmium, ruthenium, and iridium.

As used herein, the term "oxidation catalyst" refers to a catalyst promoting oxidation processes in diesel exhaust, to reduce emissions of the organic fraction of diesel particulates, gas-phase hydrocarbons, and/or carbon monoxide.

As used herein, the term "sulfur content" refers to the amount of sulfur present in fuel. Low sulfur diesel is a standard for defining diesel fuel with substantially lowered sulfur contents. As of 2006, almost all of the petroleum-based diesel fuel available in the United Kingdom, Europe, and North America is of a low sulfur diesel type. As used herein, the term "low sulfur fuel" refers to fuel that contains less than 10 ppm of sulfur, including less than 9, less than 8, less than 7, less than 6, less than 5, less than 4, less than 3, less than 2, and less than 1 ppm sulfur. In one or more embodiments, low sulfur fuel contains 0 ppm sulfur, which can include synthetic fuels. In other parts of the world, particularly in developing countries, fuel contains significantly higher amounts of sulfur. Additionally, marine fuel contains very high amounts of sulfur. In some cases, the sulfur content of fuel on the open ocean can be as high as 35,000 ppm. However, in marine regulations, there are special Emission Controlled Areas (ECA zones) in coastal waters, where the maximum allowed concentration for the fuel is 10,000 ppm and, under new regulations, will be reduced down to 1000 ppm. Ships run with different fuels on the open ocean and in the ECA zones. As used herein, the term "high sulfur fuel" refers to fuel that contains greater than 10 ppm sulfur, including greater than 50, greater than 100, greater than 150, greater than 200, greater than 250, greater than 300, greater than 350, greater than 500, greater than 1000, greater than 1500, greater than 2000, greater than 2500, greater than 3000 ppm, greater than 5000, greater than 10,000, greater than 20,000, greater than 30,000, and greater than 35,000 ppm sulfur.

As used herein, the term "active regeneration" refers to the introduction of a combustible material (e.g., diesel fuel) into the exhaust and burning it across a catalyst to generate an exotherm that provides heat (e.g. about 300-700° C.) needed to burn particulate matter such as soot from the filter. Active regeneration processes are generally needed to clear out the accumulated particulate matter, and restore acceptable back pressures within the particulate filter. The soot fraction of the particulate matter generally requires temperatures in excess of 500° C. to burn under oxygen rich (lean) conditions when oxygen is used for the carbon oxidation. This temperature is higher than what is typically present in diesel exhaust. Another mechanism for the soot oxidation is its reaction with $NO_2$, which takes place with sufficient rates of reaction in the temperature interval between 250 and 500° C. The reason for the upper boundary temperature is the thermodynamic equilibrium between NO and $NO_2$ in the presence of oxygen, which results in low $NO_2$ concentrations by increasing temperature.

As used herein, the terms "ammonia destruction catalyst" or "ammonia oxidation catalyst (AMOX)" refer to a catalyst that promotes the oxidation of $NH_3$.

As used herein, the terms "particulate filter" or "soot filter" refer to a filter designed to remove particulate matter from an exhaust gas stream such as soot. Particulate filters include, but are not limited to honeycomb wall flow filters, partial filtration filter, a wire mesh filter, wound fiber filters, sintered metal filters; and foam filters.

As used herein, the term "operating window" refers to the temperature and space velocity values encountered by a catalytic component during operation of the engine. The temperature of the operating window can vary between 0° C. and 800° C., and the space velocity can vary between 0 and 1,000,000/hour.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina, silica, titania, and other materials are known for such use. One or more embodiments of the present invention include a refractory metal oxide support comprising an activated compound selected from the group consisting of alumina, zirconia, silica, titania, ceria, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania, or combinations thereof. Although many of these materials suffer from the disadvantage of having a considerably lower BET surface area than activated alumina, that disadvantage tends to be offset by a greater durability or performance enhancement of the resulting catalyst.

As used herein, the term "base metal" refers generally to a metal that oxidizes or corrodes relatively easily when exposed to air and moisture. In one or more embodiments, the base metal catalyst comprises a base metal material in an amount effective to generate an exotherm over a temperature range of 300° C. to 550° C. In one or more embodiments, the base metal material can comprise one or more base metal oxides selected from vanadium (V), tungsten (W), titanium (Ti), copper (Cu), iron (Fe), cobalt (Co), nickel (Ni), chromium (Cr), manganese (Mn), neodymium (Nd), barium (Ba), cerium (Ce), lanthanum (La), praseodymium (Pr), magnesium (Mg), calcium (Ca), zinc (Zn), niobium (Nb), zirconium (Zr), molybdenum (Mo), tin (Sn), tantalum (Ta), cerium (Ce), and strontium (Sr), or combinations thereof. In a specific embodiment, the base metal material comprises one or more of vanadium (V), iron (Fe), cerium (Ce), copper (Cu), tungsten (W), aluminum (Al), and titanium (Ti).

In one or more embodiments, the base metal catalyst is substantially free of platinum group metal. As used herein, the term "substantially free of platinum group metal" means that there is no platinum group metal intentionally added to the base metal catalyst, and that there is less than about 5 g/ft$^3$ of platinum group metal by weight in the base metal catalyst. In specific embodiments, there is less than about 5 g/ft$^3$ by weight of platinum group metal, including less than about 4, 3, 2, and 1 g/ft$^3$ by weight of platinum group metal in the base metal catalyst. In one or more embodiments, the base metal catalyst contains no added platinum group metals and the catalyst is free of platinum group metals. In one or more embodiments, there are no platinum group metal oxidation catalysts upstream from the base metal catalyst. In one or more embodiments, a platinum group metal oxidation catalyst is located downstream from the base metal catalyst. In other embodiments, there are no platinum group metal oxidation catalysts upstream from the SCR catalyst and/or downstream from the base metal catalyst. Without intending to be bound by theory, it is thought that the platinum group metal oxidation catalyst facilitates one or more of NO, CO, NH$_3$ and HC oxidation. Optionally, and depending on the HC slip out of the base metal catalyst, the HC oxidation can take place even at relatively high HC concentrations to generate an additional exotherm over the platinum group metal oxidation catalyst (temperature increase between 5° C. up to 450° C.).

In one or more embodiments, the base metal catalyst further comprises a molecular sieve material. As used herein, the term "molecular sieve", such as zeolites and other zeolitic framework materials, refer to materials, which may in particulate form support catalytic precious group metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms.

Generally, zeolites are defined as aluminosilicates with open 3-dimensional framework structures composed of corner-sharing TO$_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable.

According to one or more embodiments, the classification of the zeolite can be based on the framework topology by which the structures are identified. Typically, any structure type of zeolites/aluminosilicates can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In some embodiments, the zeolite can be a natural or synthetic zeolite such as faujasite, chabazite, clinoptilolite, mordenite, silicalite, zeolite X, zeolite Y, ultrastable zeolite Y, ZSM-5, ZSM-12, SSZ-3, SAPO 5, offretite, or a beta zeolite.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolite structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve material comprises a zeolite comprising a d6r unit. In specific embodiments, the molecular sieve is a zeolite having a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In other specific embodiments, the molecular sieve is a zeolite having a structure type selected from the group consisting of CHA, AEI, AFX, ERI, KFI, LEV, and combinations thereof. In very specific embodiments, the zeolite has a structure type selected from CHA, AEI, and AFX. In still further specific embodiments, the zeolite has the CHA structure type.

The ratio of silica to alumina of an aluminosilicate molecular sieve component can vary over a wide range. In one or more embodiments, the molecular sieve component has a silica to alumina molar ratio (SAR) in the range of 2 to 300, including 5 to 250; 5 to 200; 5 to 100; and 5 to 50. In one or more specific embodiments, the molecular sieve component has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In one or more embodiments, the base metal catalyst is a crystalline material comprising a base metal material and a molecular sieve. The synthesis of a molecular sieve varies according to the structure type, but usually, molecular sieves, such as zeolites are synthesized using a structure directing agent (SDA), sometimes referred to as a template (or organic template) together with sources of silica and alumina. The structure directing agent can be in the form of an organic, i.e. tetraethylammonium hydroxide (TEAOH), or inorganic cation, i.e. $Na^+$ or $K^+$. During crystallization, the tetrahedral units organize around the SDA to form the desired framework, and the SDA is often embedded within the pore structure of the zeolite crystals. In one or more embodiments, the crystallization of the zeolite can be obtained by means of the addition of structure-directing agents/templates, crystal nuceli or elements.

As used herein, "promoted" refers to a component that is intentionally added to the molecular sieve, as opposed to impurities inherent in the molecular sieve. Thus, a promoter is intentionally added to enhance activity of a catalyst compared to a catalyst that does not have promoter intentionally added. In one or more embodiments, the base metal material is exchanged into the zeolite as a promoter. According to one or more embodiments, the base metal material is selected from Cu, Fe, Co, Ni, La, Ce, Mn, and combinations thereof, and the base metal material is exchanged into the zeolite as a promoter. In specific embodiments, the base metal material is selected from Cu, Fe, and combinations thereof.

The base metal content of the base metal catalyst, calculated as the oxide, is, in one or more embodiments, at least about 0.1 wt. %, reported on a volatile-free basis, based on the overall washcoat applied to the substrate. In one or more specific embodiments, the base metal material comprises one or more of V, W, Ti, Cu, Fe, and combinations thereof. When the base metal material comprises V ($V_2O_5$), the base metal is present in an amount in the range of from about 0.1 wt. % to 10 wt. %, based on the overall washcoat applied to the substrate, including 0.5, 1, 2, 3, 4, 5, 6, 7, 8, 9, and 10 wt. %. When the base metal material comprises W ($WO_3$), the base metal is present in an amount in the range of 1 wt. % to 20 wt. %, based on the overall washcoat applied to the substrate, including 1, 2, 3, 4, 5, 6, 7, 8, 9, 10, 11, 12, 13, 14, 15, 16, 17, 18, 19, and 20 wt. %. In one or more embodiments, Ti is present in the oxide form, $TiO_2$, in an amount of up to 99.9 wt. %, based on the overall washcoat applied to the substrate. In other embodiments, the base metal comprises Cu, and the Cu content, calculated as CuO is in the range of up to about 10 wt. %, including 9, 8, 7, 6, 5, 4, 3, 2, and 1 wt. %, in each case based on the total weight of the calcined catalyst reported on a volatile free basis. In very specific embodiments, the Cu content, calculated as CuO, is in the range of about 2 to about 5 wt. %. In one or more embodiments, the base metal material comprises Fe, and the Fe content, calculated as $Fe_2O_3$ is in the range of up to about 10 wt. %, including 9, 8, 7, 6, 5, 4, 3, 2, and 1 wt. %, in each case based on the total weight of the calcined catalyst reported on a volatile free basis. In one or more embodiments, the base metal material comprises $FeVO_4$, and the $FeVO_4$ content, calculated as $FeVO_4$ is in the range of up to about 16 wt. %, including 15, 14, 13, 12, 11, 10, 9, 8, 7, 6, 5, 4, 3, 2, and 1 wt. %, in each case based on the total weight of the calcined catalyst reported on a volatile free basis.

Figure 2:
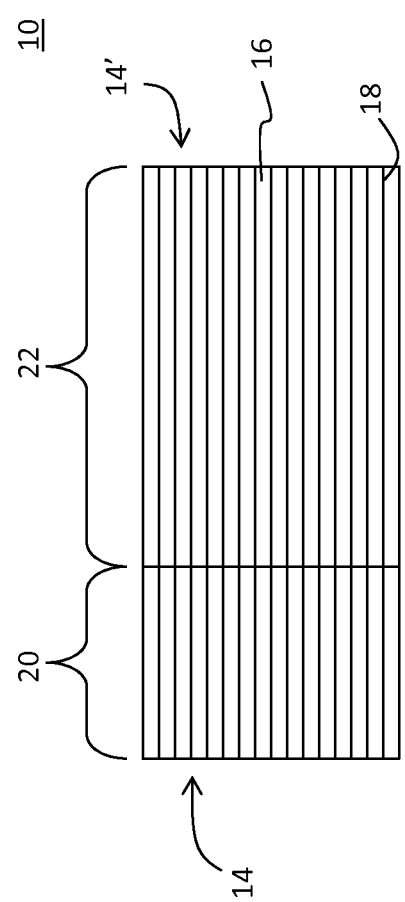
FIG. 2 shows a cross-sectional view taken along line 2-2 of FIG. 1.

In one or more embodiments, the base metal catalyst is disposed on a flow through substrate. FIGS. 1 and 2 illustrate a honeycomb flow through substrate that can be used according to embodiments of the invention. The base metal catalysts comprise a substrate 10 which has an outer surface 12, and an inlet end 14 and an outlet end 14'. Wall elements 18 define a plurality of parallel passages 16. Each passage 16 has a corresponding inlet and outlet. A base metal catalyst is associated with the wall elements 18 so that the gases flowing through the passages 16 contact the base metal catalyst. According to one or more embodiments, the base metal catalyst can be present in any form, including but not limited to as a washcoat and as an extrudate. According to one or more embodiments, the base metal catalyst is washcoated onto the substrate 10. The base metal catalyst can be a single layer washcoated onto the substrate, or there can be multiple base metal catalyst layers. In other embodiments, the base metal catalyst can be combined with a second base metal catalyst. In embodiments where there are two base metal catalysts, the first base metal catalyst is coated onto the substrate and the second base metal catalyst is coated overlying the first base metal catalyst. In other embodiments, the first and second base metal catalysts are arranged in a zoned configuration. In one or more embodiments, the first and second base metal catalysts are arranged in a axially zoned configuration, with the first base metal catalyst upstream from the second base metal catalyst. As used herein, the term "axially zoned" refers to the location of the first and second base metal catalysts relative to one another. Axially means side-by-side such that the first and second base metal catalysts are located one beside the other. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. According to one or more embodiments, the axially zoned first and second base metal catalysts can be arranged on the same or a common substrate or on different substrates separated from each other.

Figure 3:
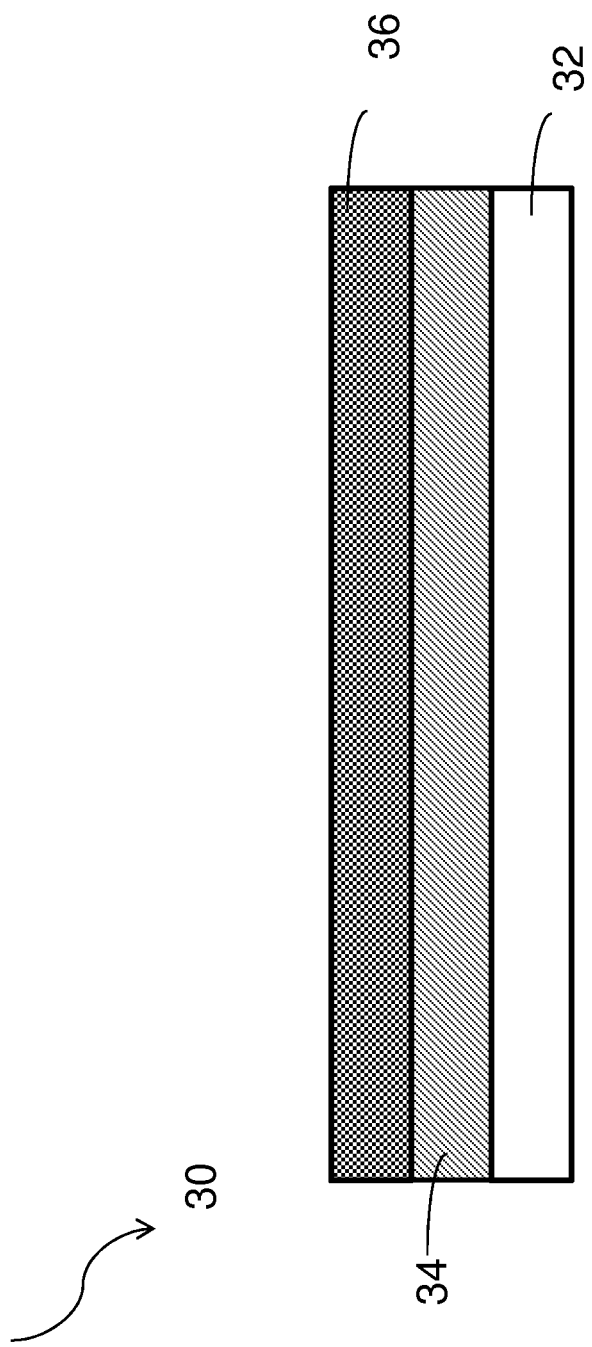
FIG. 3 shows a partial cross-sectional view of catalytic article according to one or more embodiments.

According to one or more embodiments, there are no platinum group metal oxidation catalysts upstream from the base metal catalyst. In other embodiments, the base metal catalyst can be combined with a platinum group metal oxidation catalyst. In embodiments where there are both a base metal catalyst and a platinum group metal oxidation catalyst, the base metal catalyst and the platinum group metal oxidation catalyst can be on the same or a common substrate, or can be on different substrates separated from one another. As illustrated in FIG. 3, when a layered article 30, a substrate 32 is washcoated with the platinum group metal oxidation catalyst to form a first layer (or a bottom coat) 34, and the base metal catalyst is washcoated on top of the first layer to form a second layer (or top coat) 36. It will be appreciated by one of skill in the art that the top coat/second layer is upstream of the bottom coat/first layer, such that the top coat/second layer is the upstream zone and the bottom coat/first layer is the downstream zone.

Figure 4:
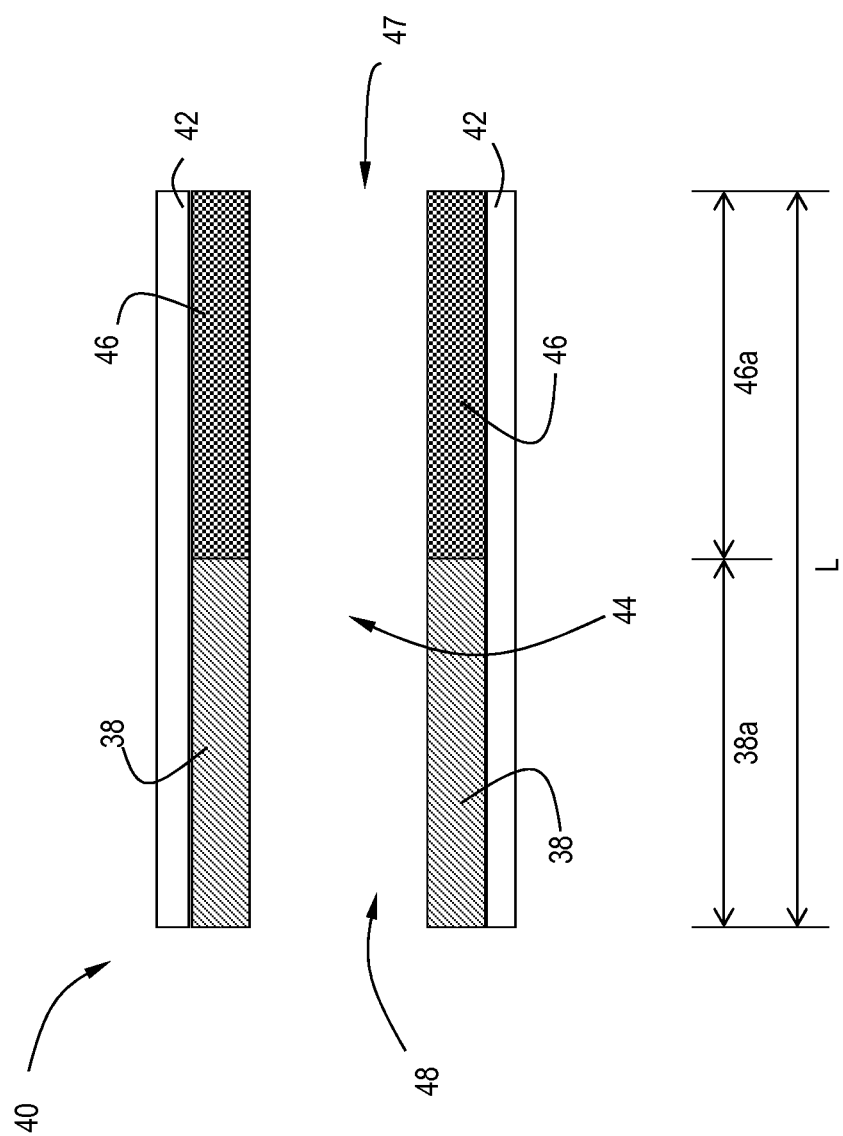
FIG. 4 shows a partial cross-sectional view of catalytic article according to one or more embodiments.

Referring to FIG. 4, an exemplary embodiment of an axially zoned system is shown. The catalytic article 40 is shown in an axially zoned arrangement where the base metal catalyst 38 is located upstream of the platinum group metal oxidation catalyst 46 on a common substrate 42. The substrate 42 has an inlet end 48 and an outlet end 47 defining an axial length L. In one or more embodiments, the substrate 42 generally comprises a plurality of channels 44 of a honeycomb substrate, of which only one channel is shown in cross-section for clarity. The base metal catalyst 38 extends from the inlet end 48 of the substrate 42 through less than the entire axial length L of the substrate 42. The length of the base metal catalyst 38 is denoted as first zone 38a in FIG. 4. The platinum group metal oxidation catalyst 38 extends from the outlet end 47 of the substrate 42 through less than the entire axial length L of the substrate 42. The length of the platinum group metal oxidation catalyst is denoted as the second zone 46a in FIG. 4.

In one or more embodiments, as illustrated in FIG. 4, the upstream zone 38 comprising the base metal catalyst is directly abutting the downstream zone 46 comprising the platinum group metal catalyst. In other embodiments, the upstream zone 38 comprising the base metal catalyst is separated by a gap (not shown) from the downstream zone 46 comprising platinum group metal oxidation catalyst.

It will be appreciated that the length of the upstream zone 38 and the downstream zone 46 can be varied. In one or more embodiments, the upstream zone 38 and the downstream zone 46 can be equal in length. In other embodiments, the upstream zone 38 can be 20%, 25%, 35% or 40%, 60%, 65%, 75% or 80% of the length L of the substrate 42, with the downstream zone 46 respectively covering the remainder of the length L of the substrate, as depicted in FIG. 4. In other embodiments, the upstream zone 38 can be 20%, 25%, 35% or 40%, 60%, 65%, 75% or 80% of the length L of the substrate 42, with the downstream zone 46 respectively covering the remainder of the length L of the substrate, with a gap (not shown).

Figure 5:
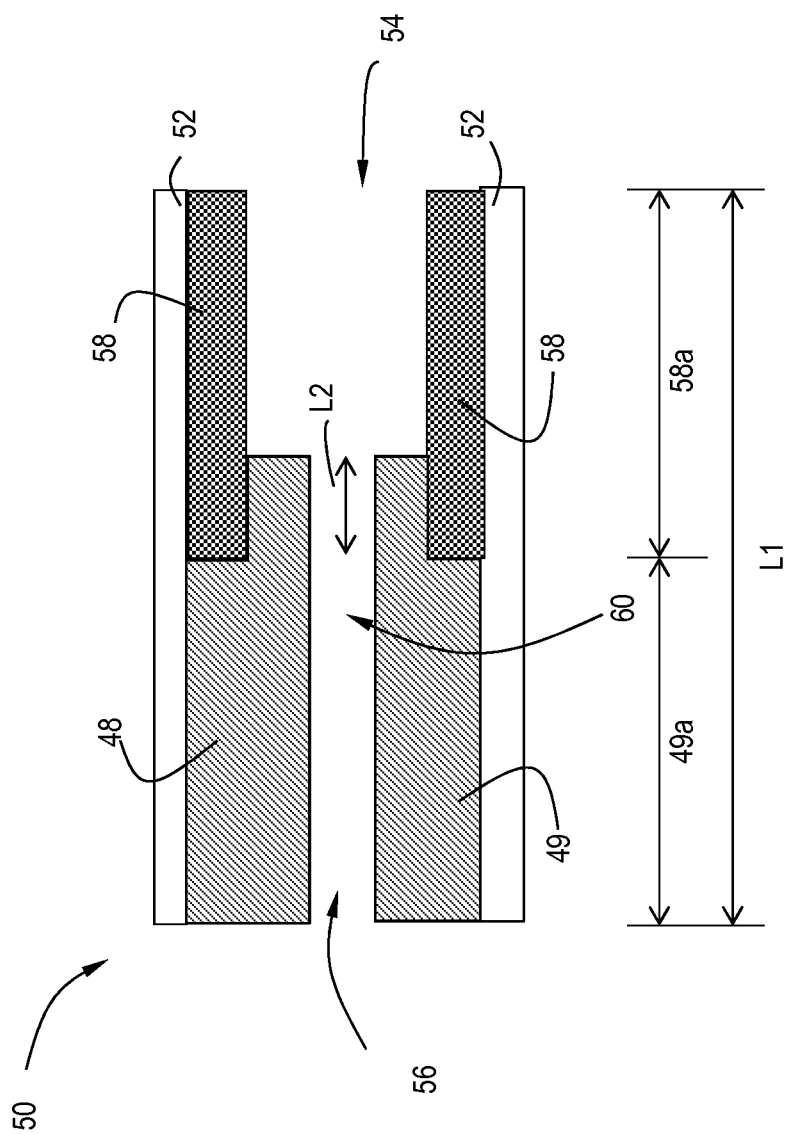
FIG. 5 shows a partial cross-sectional view of catalytic article according to one or more embodiments.

It will also be appreciated by one skilled in the art that the upstream zone and downstream zone can be at least partially overlapping. In one or more embodiments the upstream zone comprising the base metal catalyst is at least partially overlapping the downstream zone comprising the platinum group metal oxidation catalyst. Referring to FIG. 5, an exemplary embodiment of an axially zoned system is shown. The catalytic article 50 is shown in an axially zoned arrangement where the base metal catalyst 49 is located upstream of the platinum group metal oxidation catalyst 58 on a common substrate 52. The substrate 52 has an inlet end 56 and an outlet end 54 defining an axial length L1. In one or more embodiments, the substrate 52 generally comprises a plurality of channels 60 of a honeycomb substrate, of which only one channel is shown in cross-section for clarity. The base metal catalyst 49 extends from the inlet end 56 of the substrate 52 through less than the entire axial length L1 of the substrate 52 and at least partially overlapping the downstream zone comprising the platinum group metal oxidation catalyst 58. The length of the base metal catalyst 58 is denoted as first zone 49a in FIG. 5. The platinum group metal oxidation catalyst 58 extends from the outlet end 54 of the substrate 52 through less than the entire axial length L1 of the substrate 52. The length of the platinum group metal oxidation catalyst is denoted as the second zone 58a in FIG. 5. The length of the at least partial overlap is denoted as L2 in FIG. 5. In one or more embodiments, the base metal catalyst 49 completely overlaps the platinum group metal oxidation catalyst 58.

Figure 6:
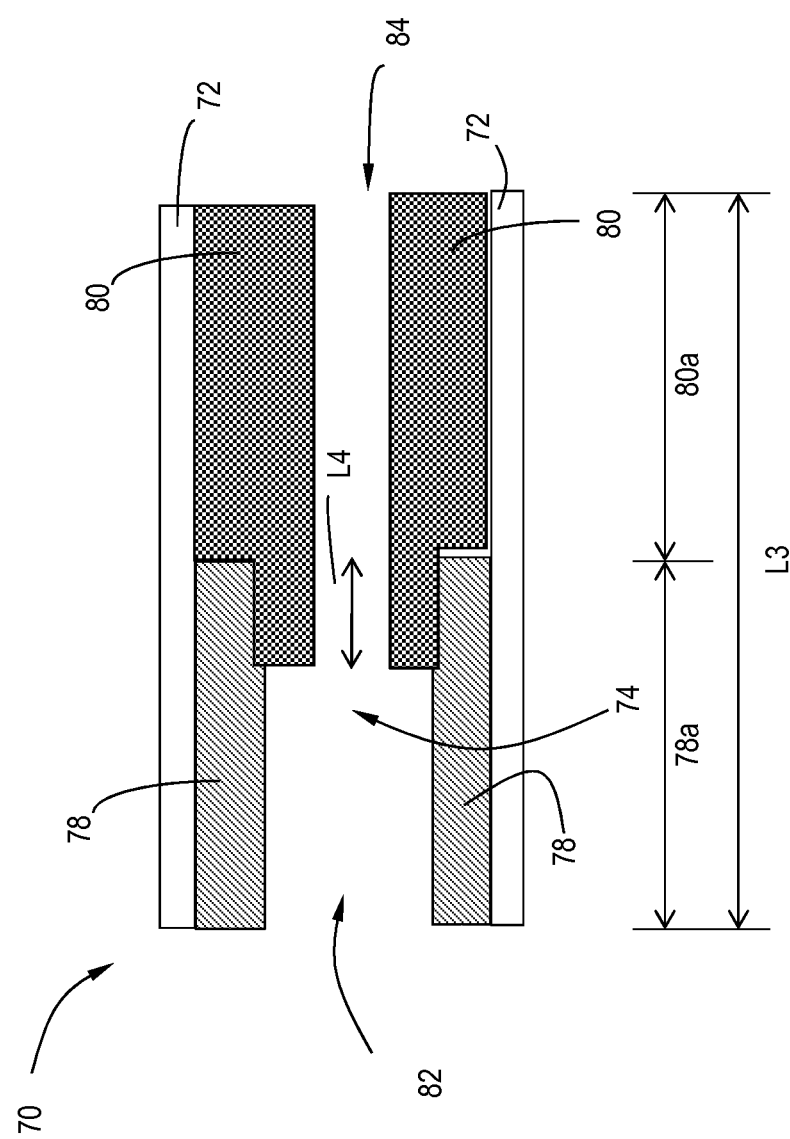
FIG. 6 shows a partial cross-sectional view of catalytic article according to one or more embodiments.

In other embodiments, the downstream zone comprising the platinum group metal oxidation catalyst is at least partially overlapping the upstream zone comprising the base metal catalyst. Referring to FIG. 6, an exemplary embodiment of an axially zoned system is shown. The catalytic article 70 is shown in an axially zoned arrangement where the base metal catalyst 78 is located upstream of the platinum group metal oxidation catalyst 80 on a common substrate 72. The substrate 72 has an inlet end 82 and an outlet end 84 defining an axial length L3. In one or more embodiments, the substrate 72 generally comprises a plurality of channels 74 of a honeycomb substrate, of which only one channel is shown in cross-section for clarity. The base metal catalyst 78 extends from the inlet end 82 of the substrate 72 through less than the entire axial length L3 of the substrate 72. The length of the base metal catalyst 78 is denoted as first zone 78a in FIG. 6. The platinum group metal oxidation catalyst 80 extends from the outlet end 84 of the substrate 72 through less than the entire axial length L3 of the substrate 72, and partially overlapping the upstream zone comprising the base metal catalyst 78. The length of the platinum group metal catalyst is denoted as the second zone 80a in FIG. 6. The length of the at least partial overlap is denoted as L4 in FIG. 6. In one or more embodiments, the platinum group metal oxidation catalyst 80 completely overlaps the base metal catalyst 78.

Figure 7:
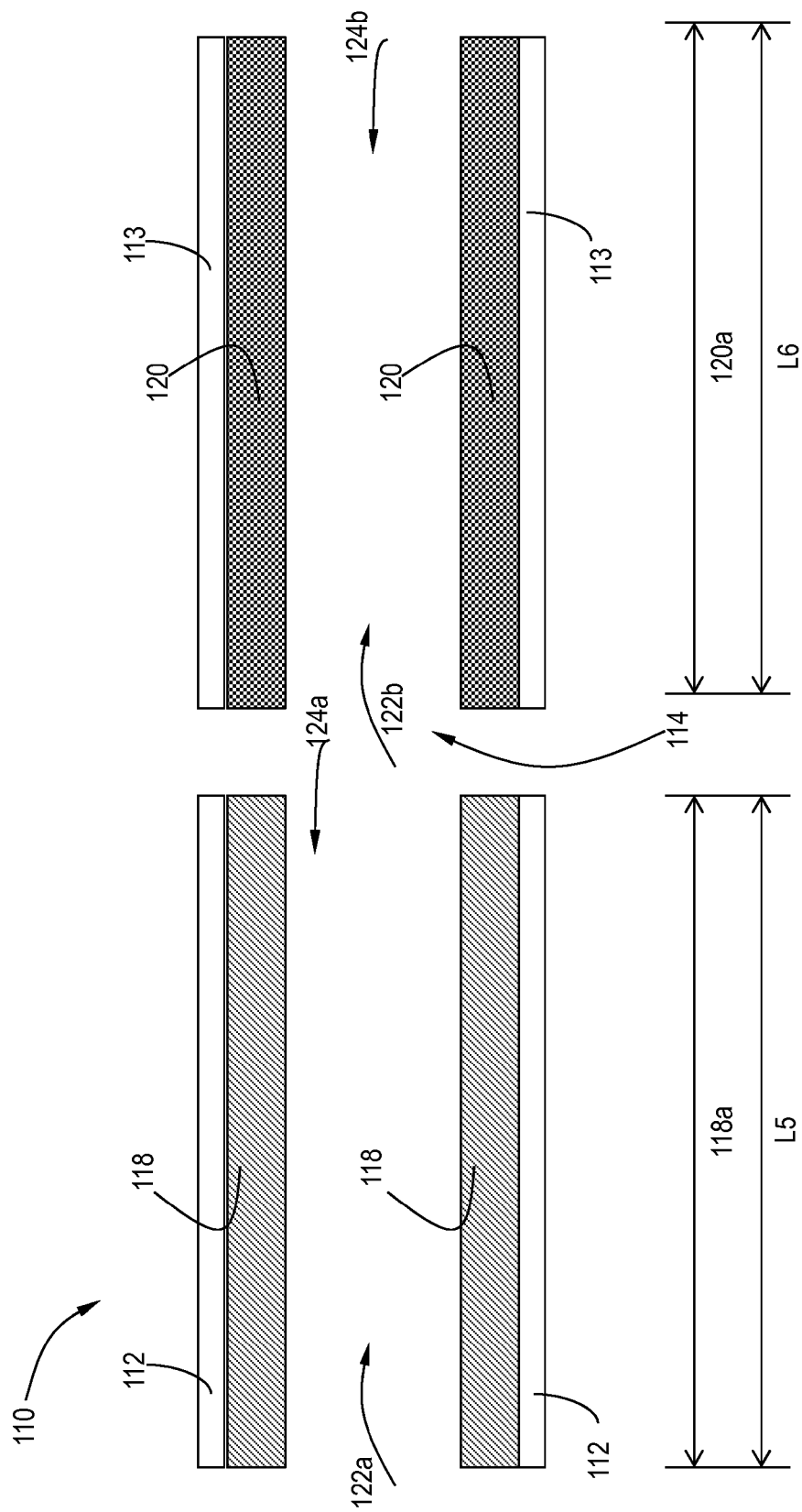
FIG. 7 shows a partial cross-sectional view of catalytic article according to one or more embodiments.

Referring to FIG. 7, another embodiment of an axially zoned catalytic article 110 is shown. The catalytic article 110 shown is an axially zoned arrangement where the base metal catalyst 118 is located upstream of the platinum group metal oxidation catalyst 120 on separate substrates, a first substrate 112 and a second substrate 113. The base metal catalyst 118 is disposed on a first substrate 112, and the platinum group metal oxidation catalyst is disposed on a separate second substrate 113. The first and second substrates 112 and 113 can be comprised of the same material or a different material. The first substrate 112 has an inlet end 122a and an outlet end 124a defining an axial length L5. The second substrate 113 has an inlet end 122b and an outlet end 124b defining an axial length L6. In one or more embodiments, the first and second substrates 112 and 113 generally comprise a plurality of channels 114 of a honeycomb substrate, of which only one channel is shown in cross-section for clarity. The iron-promoted first molecular sieve 118 extends from the inlet end 122a of the first substrate 112 through the entire axial length L1 of the first substrate 112 to the outlet end 124a. The length of the base metal catalyst 118 is denoted as first zone 118a in FIG. 7. The platinum group metal oxidation catalyst 120 extends from the outlet end 124b of the second substrate 113 through the entire axial length L6 of the second substrate 113 to the inlet end 122b. The platinum group metal oxidation catalyst 120 defines a second zone 120a. The length of the platinum group metal oxidation catalyst is denoted as the second zone 20b in FIG. 7. The length of the zones 118a and 120a can be varied as described with respect to FIG. 4.

In one or more embodiments, the base metal catalyst is disposed on a flow-through substrate like that depicted in FIGS. 1 and 2. In other embodiments, the base metal catalyst is integrated with additional components, such as a particulate filter.

Other aspects are directed to method of making a base metal catalyst. A slurry is prepared comprising a base metal material. A substrate is washcoated with the slurry to result in a loading. In one or more embodiments, the loading is in the range of 0.5 to 10 g/in$^3$, including 1, 2, 3, 4, 5, 6, 7, 8, 9 g/in$^3$.

The Substrate

In one or more embodiments, the base metal catalyst can be applied to a substrate as a washcoat. As used herein, the term "substrate" refers to the monolithic material onto which the base metal catalyst is placed, typically in the form of a washcoat. A washcoat is formed by preparing a slurry containing a specified solids content (e.g., 30-90% by weight) of base metal catalyst in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the base metal catalyst of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

Substrates that are also useful with the base metal catalyst and optional exhaust component described are open-cell foam filters and wall flow filters. An open cell foam substrate contains a plurality of pores. The foam is an open-celled foam and the catalyst coating is deposited on the walls of the cells. The open-celled structure of the foam provides the coated substrate with a high surface area of the catalyst per volume. An exhaust stream passing the substrate from the inlet end to the outlet end of the substrate flows through the plurality of cells defined by the walls of the foam to contact the catalyst layer deposited on the walls of the cells.

The foam substrate may be composed of metallic or ceramic materials. Examples of ceramic foams are disclosed in U.S. Pat. No. 6,077,600, which is herein incorporated by reference in its entirety. Ceramic foam carriers have walls formed from fibers coated with ceramic materials. Substrates in the form of metal foams are well known in the prior art, e.g., see U.S. Pat. No. 3,111,396, which is herein incorporated by reference in its entirety.

Other alternate substrate are wall flow substrates useful for supporting the catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. An example of a suitable wall flow substrate has a wall thickness of between about 0.002 and 0.015 inches.

Suitable wall flow filter substrates are composed of ceramic-like materials such as cordierite, α-alumina, silicon carbide, silicon nitride, zirconia, mullite, spodumene, alumina-silica-magnesia, aluminum titanate or zirconium silicate, or of any other suitable porous, refractory metal. Wall flow substrates may also be formed of ceramic fiber composite materials. Suitable wall flow substrates are formed from cordierite and silicon carbide. Such materials are able to withstand the environment, particularly high temperatures, encountered in treating the exhaust streams.

Suitable wall flow substrates for use in the inventive system include thin porous walled honeycombs (monoliths) through which the fluid stream passes without causing too great an increase in back pressure or pressure across the article. Normally, the presence of a clean wall flow article will create a back pressure of 1 inch water column to 10 psig. Ceramic wall flow substrates used in the system may be formed of a material having a porosity of at least 50% (e.g., from 50 to 75%) having a mean pore size of at least 5 microns (e.g., from 5 to 30 microns). When substrates with these porosities and these mean pore sizes are coated with the techniques described below, adequate levels of SCR catalyst compositions can be loaded onto the substrates to achieve excellent $NO_x$ conversion efficiency. These substrates are still able retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Suitable wall flow filters may be formed with lower wall porosities, e.g., from about 35% to 50%, than the wall flow filters utilized in the invention. In general, the pore size distribution of a suitable commercial wall flow filter is very broad with a mean pore size smaller than 17 microns.

The porous wall flow filter used according to embodiments of this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with a catalyst composition, the substrates are immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry typically permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 600° C.). After calcining, the catalyst loading can be determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Exhaust Gas Treatment System

A further aspect of the invention relates to an emission treatment system that effectively provides simultaneous treatment of the particulate matter, the $NO_x$ and other gaseous components of diesel engine exhaust. In one or more embodiments, the diesel engine can be operated with state of the art or high sulfur fuels. Due to the choice of catalytic compositions implement in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

Figure 8:
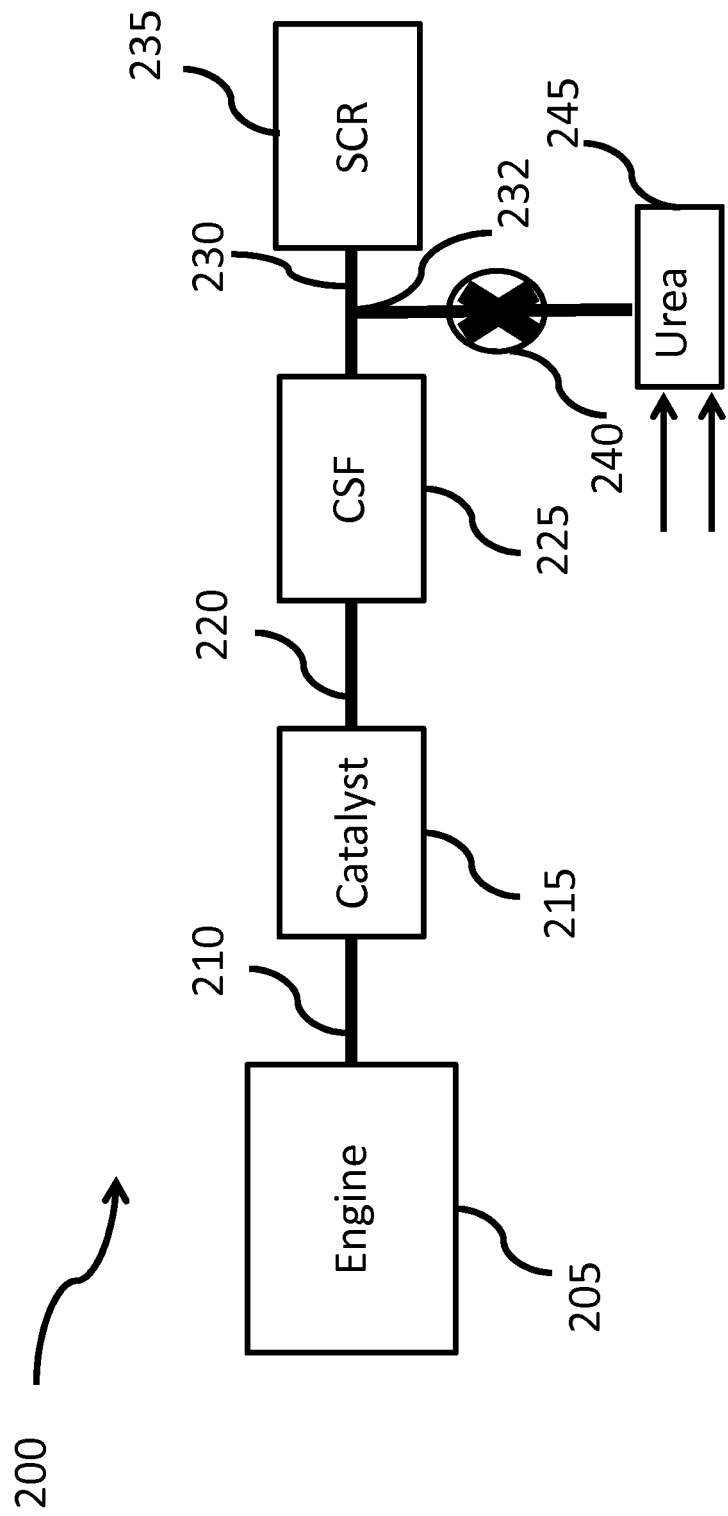
FIG. 8 is a schematic of an engine treatment system according to one or more embodiments.

One embodiment of the inventive emission treatment system 200 is schematically depicted in FIG. 8. As can be seen in FIG. 8, the exhaust containing gaseous pollutants (including unburned hydrocarbons, carbon monoxide and $NO_x$) and particulate matter is conveyed from the engine 205 through exhaust gas conduit 210 to the base metal catalyst 215. In the base metal catalyst 215, unburned gaseous and non-volatile hydrocarbons (i.e., the VOF) and carbon monoxide are largely combusted to form carbon dioxide and water. Additional hydrocarbons to create a necessary and desired temperature increase over the base metal catalyst 215 can be introduced either via post injection into the cylinder of the engine or via a fuel injector in front of the base metal catalyst 215. Removal of substantial proportions of the VOF using the base metal catalyst, in particular, helps prevent too great a deposition of particulate matter on the soot filter 225 (i.e., clogging), which is positioned downstream in the system. In addition, substantially no $NO_2$ is generated in the base metal catalyst. For instance, the amount of $NO_2$ entering the base metal catalyst is substantially the same or less than the amount exiting the base metal catalyst. When the base metal catalyst is designed to have selective catalytic reduction (SCR) activity, an optional introduction of a reductant (e.g. ammonia via urea solution injection) would lead to a reduction of the NO over the base metal catalyst 215.

Accordingly, one or more embodiments are directed to a system for treating an exhaust stream comprising $NO_x$ from an engine. The system comprises a base metal catalyst, as previously described, disposed downstream of the engine. As appreciated by one skilled in the art, the exact catalyst composition and loading provided that regulates the amount of $NO_2$ exiting the base metal catalyst will depend on the particular application and factors such as whether the engine is a heavy duty diesel engine, a light duty diesel engine, the operating temperature, space velocity, the sulfur content of the fuel, and other factors. The base metal catalysts can be coated onto honeycomb flow-through monolith substrates formed of refractory metallic or ceramic foam substrates which are known in the art. The base metal catalyst, by virtue of the substrate on which they are coated (e.g. open cell ceramic foam), and/or by virtue of their intrinsic catalytic activity provide some level of particulate removal. The base metal catalyst may remove some of the particulate matter from the exhaust stream upstream of the filter, since the reduction in the particulate mass on the filter potentially extends the time before forced regenerations.

In one or more embodiments, the base metal catalyst that may be used in the emission treatment system comprises a base metal material selected from V, Ti, W, Fe, Cu, and combinations thereof dispersed on a high surface area refractory oxide support (e.g. titania). In other embodiments, the base metal catalyst comprises a base metal material selected from V, Ti, W, Fe, Cu, and combinations thereof dispersed on a high surface area refractory oxide support which is combined with a zeolite component (for example, chabazite). In still further embodiments, the base metal catalyst can comprise metal oxide catalyst such as iron vanadates, cerium oxide, iron oxide, or combinations thereof.

Referring to FIG. 8, in one or more embodiments, the emission treatment system 200 comprises a catalyzed soot filter 225 disposed downstream of the base metal catalyst 215. Exhaust gas flows from the base metal catalyst 215 to the catalyzed soot filter 225 via exhaust gas conduit 220. In specific embodiments, the catalyzed soot filter 225 may have a plurality of longitudinally extending passaged bounded by longitudinally extending walls. The passages comprise inlet passages having an open inlet end and a closed outlet end, and outlet passages having a closed inlet end and an open outlet end. The catalyzed soot filter 225 comprises a catalyst composition on the walls and is effective to optimize the ratio of NO to $NO_2$ exiting the filter.

The exhaust stream is conveyed to the soot filter 225, which can be coated or uncoated. On passing through the soot filter 225, particulate matter is filtered and the gas contains a certain ratio of NO and $NO_2$. The particulate matter including the soot fraction and the VOF are also largely removed (greater than 80%) by the soot filter 225. The particulate matter deposited on the soot filter 225 is combusted through regeneration of the filter, the temperature at which the soot fraction of the particulate matter combusts can be lowered by the presence of the catalyst composition disposed on the soot filter.

As illustrated in FIG. 8, an optional reductant, for example ammonia, is injected as a spray via an injector 232 and a nozzle (not shown) into the exhaust stream downstream of the soot filter 225 and into exhaust gas conduit 230. Aqueous urea can serve as the ammonia precursor which can be mixed with air in a mixing station 245. Valves 240 can be used to meter precise amounts of aqueous urea which are converted in the exhaust stream to ammonia. In one or more embodiments, downstream of the soot filter 225 is a selective catalytic reduction catalyst 235. The exhaust gas containing NO and $NO_2$ is reduced to $N_2$ in the SCR 235.

The emission treatment system of FIG. 8 has several advantages. First, having the base metal catalyst 215 located immediately downstream of the engine 205 allows it to be placed as close as possible to engine 205 ensuring rapid heat up for cold start HC and CO emissions and the maximum inlet temperature for active filter regeneration. Second, the CSF 225, which can be coated or uncoated, located upstream of the SCR 235 will prevent particulate, oil ash, and other undesirable materials from being deposited on the SCR catalyst and thus improving its durability and performance.

Figure 9:
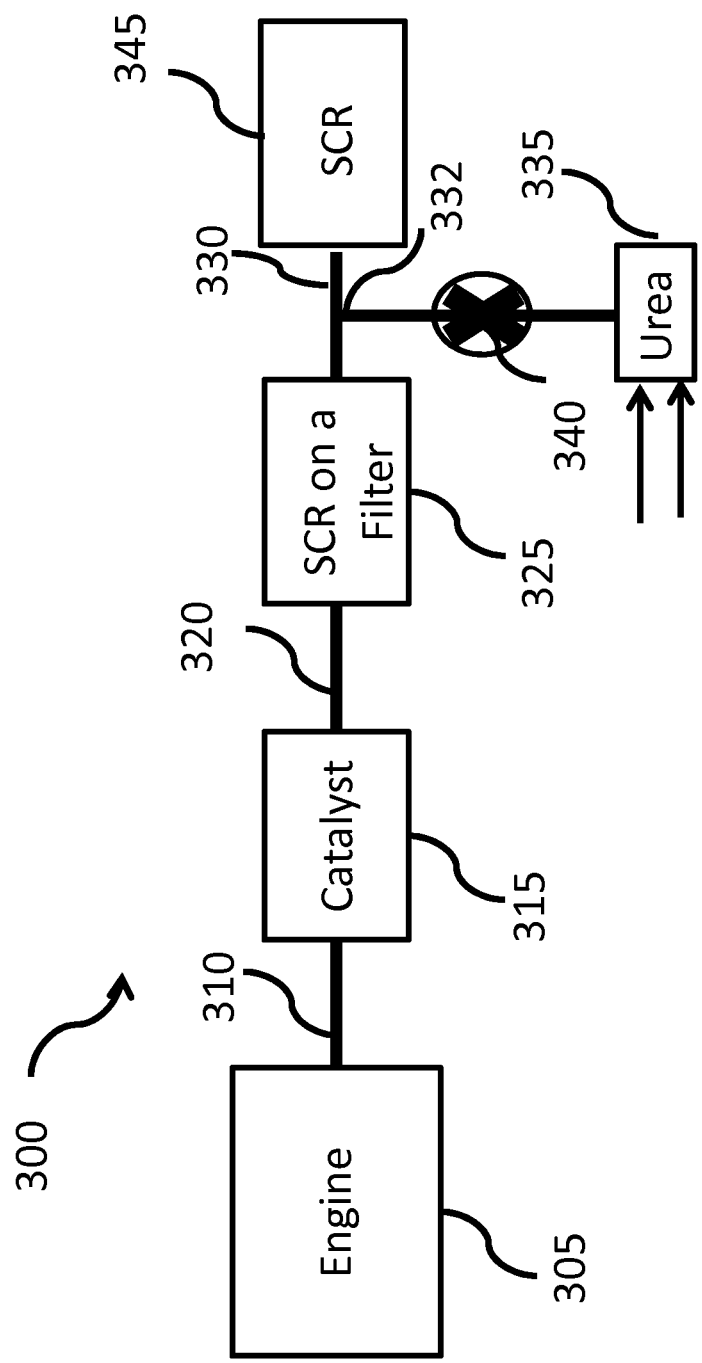
FIG. 9 is a schematic of an engine treatment system according to one or more embodiments.

Another embodiment of the inventive emission treatment system 300 is schematically depicted in FIG. 9. As can be seen in FIG. 9, the exhaust containing gaseous pollutants (including unburned hydrocarbons, carbon monoxide and $NO_x$) and particulate matter is conveyed from the engine 305 through exhaust gas conduit 310 to the base metal catalyst 315. In the base metal catalyst 315, unburned gaseous and non-volatile hydrocarbons (i.e., the VOF) and carbon monoxide are largely combusted to form carbon dioxide and water. Removal of substantial proportions of the VOF using the base metal catalyst, in particular, helps prevent too great a deposition of particulate matter on the soot filter 325 (i.e., clogging), which is positioned downstream in the system. In addition, substantially no $NO_2$ is generated in the base metal catalyst. For instance, the amount of $NO_2$ entering the base metal catalyst is substantially the same or less than the amount exiting the base metal catalyst.

In one or more embodiments, the emission treatment system 300 comprises a soot filter 325 coated with a material effective in the selective catalytic reduction of $NO_x$ (herein, SCR on a filter) by a reductant, e.g., ammonia disposed downstream of the base metal catalyst 315. Exhaust gas flows from the base metal catalyst 315 to the soot filter 325 via exhaust gas conduit 320. In specific embodiments, the SCR on a filter 325 has a plurality of longitudinally extending passages formed by longitudinally extending walls bounding and defining said passages. The passages include inlet passages that have an open inlet end and a closed outlet end, and outlet passages that have a closed inlet end and an open outlet end. The wall flow monolith contains an SCR catalyst composition that permeates the walls at a concentration of at least 1.3 $g/in^3$ (and more specifically from 1.6 to 2.4 $g/in^3$). The wall flow monolith has a wall porosity of at least 50% with an average pore size of at least 5 microns. In one or more embodiment, an SCR catalyst composition permeates the walls of the wall flow monolith so that the walls have a wall porosity of from 50 to 75% with an average pore size of from 5 to 30 microns. In some embodiments, the SCR catalyst that is coated on the filter comprises a platinum group metal. In other embodiments, the SCR catalyst that is coated on the filter is substantially free of platinum group metal.

The exhaust stream is conveyed to the SCR on a filter 325. On passing through the SCR on a filter 325, the $NO_x$ component is converted through the selective catalytic reduction of $NO_x$ with ammonia to nitrogen.

Depending on the desired level of $NO_x$ removal, additional SCR catalyst 64 can be disposed downstream of the SCR on a filter 325. For example, the additional SCR catalyst may be disposed on a monolithic, honeycomb flow through substrate or ceramic foam substrate downstream of the SCR on a filter 325. Even in these embodiments, the use of the coated SCR soot filter still achieves a reduction in the total volume of catalyst required to meet NO reduction goals.

The particulate matter including the soot fraction and the VOF are also largely removed (greater than 80%) by the SCR on a filter 325. The particulate matter deposited on the SCR on a filter 325 is combusted through the regeneration of the filter, which process is also aided by the presence of the SCR catalyst composition. The temperature at which the soot fraction of the particulate matter combusts is lowered by the presence of the catalyst composition disposed on the soot filter.

As illustrated in FIG. 9, an optional reductant, for example ammonia, is injected as a spray via an injector 332 and a nozzle (not shown) into exhaust gas conduit 330 downstream of the SCR on a filter 325. Aqueous urea can serve as the ammonia precursor which can be mixed with air in a mixing station 335. Valves 340 can be used to meter precise amounts of aqueous urea which are converted in the exhaust stream to ammonia. In one or more embodiments, downstream of the SCR on a filter 325 is a selective catalytic reduction catalyst 345. The exhaust gas containing NO and $NO_2$ is reduced to $N_2$ in the SCR.

Figure 10:
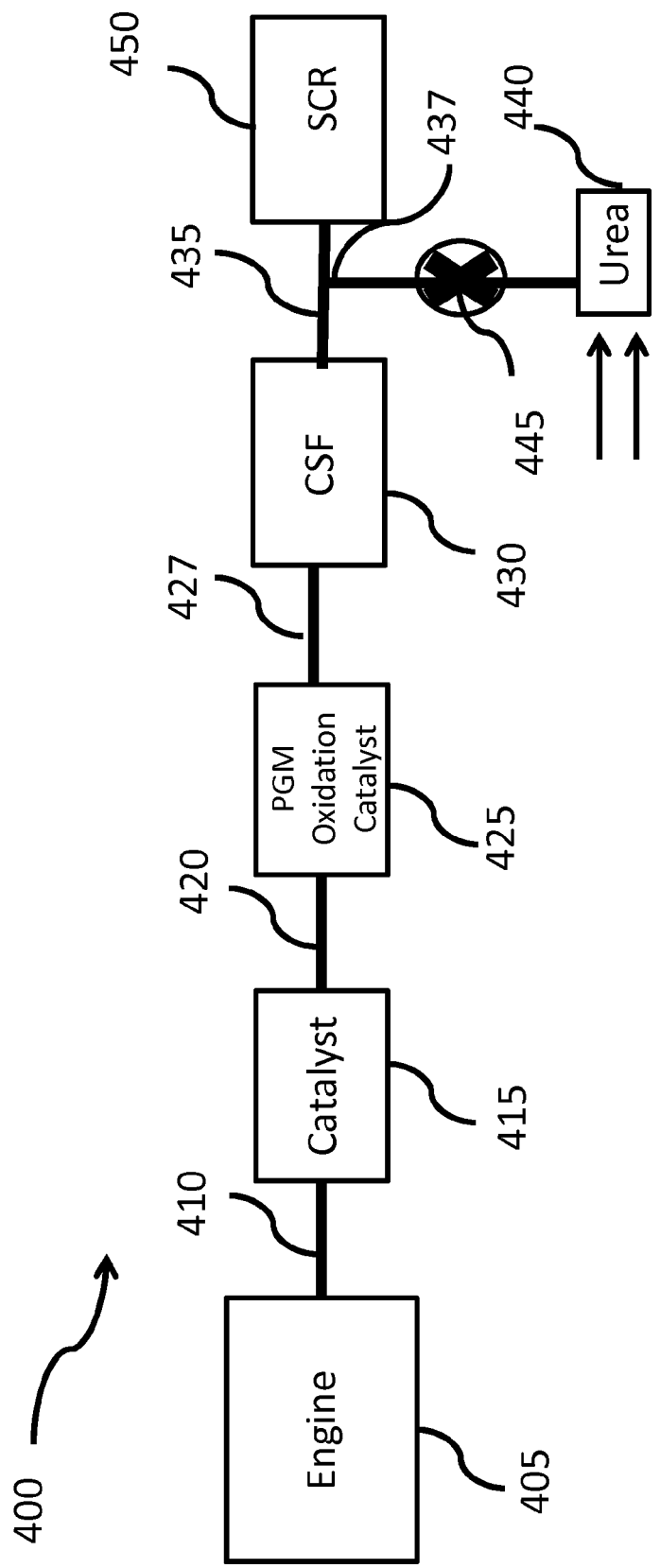
FIG. 10 is a schematic of an engine treatment system according to one or more embodiments.

Another embodiment of the inventive emission treatment system 400 is schematically depicted in FIG. 10. As can be seen in FIG. 10, the exhaust containing gaseous pollutants (including unburned hydrocarbons, carbon monoxide and $NO_R$) and particulate matter is conveyed from the engine 405 through exhaust gas conduit 410 to the base metal catalyst 415. In the base metal catalyst 415, unburned gaseous and non-volatile hydrocarbons (i.e., the VOF) and carbon monoxide are largely combusted to form carbon dioxide and water. Removal of substantial proportions of the VOF using the base metal catalyst, in particular, helps prevent too great a deposition of particulate matter on the soot filter 430 (i.e., clogging), which is positioned downstream in the system. Fuel is injected in large amounts and is burned over the base metal catalyst to create heat; which will work with high sulfur fuel as well. This is a very important and surprising finding, leading to a strong focus on fuel burning. Additional hydrocarbons to create a necessary and desired temperature increase over the base metal catalyst 415 can be introduced either via post injection into the cylinder of the engine or via a fuel injector in front of the base metal catalyst 415. A platinum group metal (PGM) oxidation catalyst (i.e. AMOX, DOC, HC oxidation catalyst, etc.) 425 positioned downstream of the base metal catalyst 415 and upstream of soot filter 430 can oxidize nitrogen oxides, carbon monoxide, hydrocarbons, and $NH_3$ as well, especially in cases where urea is injected in front of the base metal catalyst 415. Optionally, a urea injector (not shown) can be included between the engine 405 and the base metal catalyst 415. The base metal catalyst 415 is placed in front of the platinum group metal oxidation catalyst 425 to burn fuel in a sulfur rich and a low sulfur environment. In one or more embodiments, the oxidation catalyst uses platinum, however only a small amount of platinum is used in order to reduce the costs associated with production of the platinum group metal oxidation catalyst and to minimize $SO_2$ oxidation in case of a sulfur rich environment. In one or more embodiments, the amount of platinum used in the range of from 0.5 to 20 $g/ft^3$, including in the range of 1 to 20, 1 to 15, 1 to 10, 2 to 20, 2 to 15, 2 to 10, 3 to 20, 3 to 15, 3 to 10, 4 to 20, 4 to 15, 4 to 10, 5 to 20, 5 to 15, and 5 to 10 $g/ft^3$. In addition, substantially no $NO_2$ is generated in the base metal catalyst. For instance, the amount of $NO_2$ entering the base metal catalyst is substantially the same or less than the amount exiting the base metal catalyst 415.

In one or more embodiments, the emission treatment system 400 comprises a catalyzed soot filter (CSF) 430 disposed downstream of the base metal catalyst 415. Exhaust gas flows from the base metal catalyst 415 to the platinum group metal oxidation catalyst 425 via exhaust gas conduit 420, and from the PGM oxidation catalyst 425 to the downstream soot filter 430 via exhaust gas conduit 427. In specific embodiments, the catalyzed soot filter 430 has a plurality of longitudinally extending passages bounded by longitudinally extending walls. The passages may include inlet passages that have an open inlet end and a closed outlet end, and outlet passages that have a closed inlet end and an open outlet end. The catalyzed soot filter 430 comprises a catalyst composition on the walls and is effective to optimize the ratio of NO to $NO_2$ exiting the filter.

The exhaust stream is conveyed to the catalyzed soot filter 430, which can be coated or uncoated. On passing through the soot filter 430, particulate matter is filtered and the gas contains a certain ratio of NO and $NO_2$. The particulate matter including the soot fraction and the VOF are also largely removed (greater than 80%) by the soot filter 430. The particulate matter deposited on the soot filter 430 is oxidized through regeneration of the filter, the temperature at which the soot fraction of the particulate matter oxidized, can be lowered by the presence of the catalyst composition disposed on the soot filter.

As illustrated in FIG. 10, an optional reductant, for example ammonia, is injected as a spray via an injector 437 and a nozzle (not shown) into the exhaust gas stream conduit 435 downstream of the soot filter 430. Aqueous urea can serve as the ammonia precursor which can be mixed with air in a mixing station 440. Valves 445 can be used to meter precise amounts of aqueous urea which are converted in the exhaust stream to ammonia. In one or more embodiments, downstream of the soot filter 430 is a selective catalytic reduction catalyst 450. The exhaust gas containing NO and $NO_2$ is reduced to $N_2$ in the SCR.

The emission treatment system of FIG. 10 has several advantages. First, having the base metal catalyst 415 located immediately downstream of the engine 405 allows it to be placed as close as possible to the engine 405 ensuring rapid heat up for cold start HC and CO emissions and the maximum inlet temperature for active ($O_2$ based) and/or passive ($NO_2$ based) filter regeneration. The platinum group metal oxidation catalyst 425 also promotes the conversion of both HC and CO gaseous pollutants, but due to the presence of the base metal catalyst 415, it is possible to provide an oxidation catalyst with a reduced amount of platinum group metal compared to conventional/standard oxidation catalysts. In one or more embodiments, the amount of platinum group metal used in the range of from 0.5 to 20 $g/ft^3$, including in the range of 1 to 20, 1 to 15, 1 to 10, 2 to 20, 2 to 15, 2 to 10, 3 to 20, 3 to 15, 3 to 10, 4 to 20, 4 to 15, 4 to 10, 5 to 20, 5 to 15, and 5 to 10 $g/ft^3$. The placement of the base metal catalyst 415 located upstream of the platinum group metal oxidation catalyst 425 also allows the oxidation catalyst to work efficiently in a high sulfur environment, which means that, for example, the heat generated by the base metal catalyst will desulfate the downstream platinum group metal catalyst.

Figure 11:
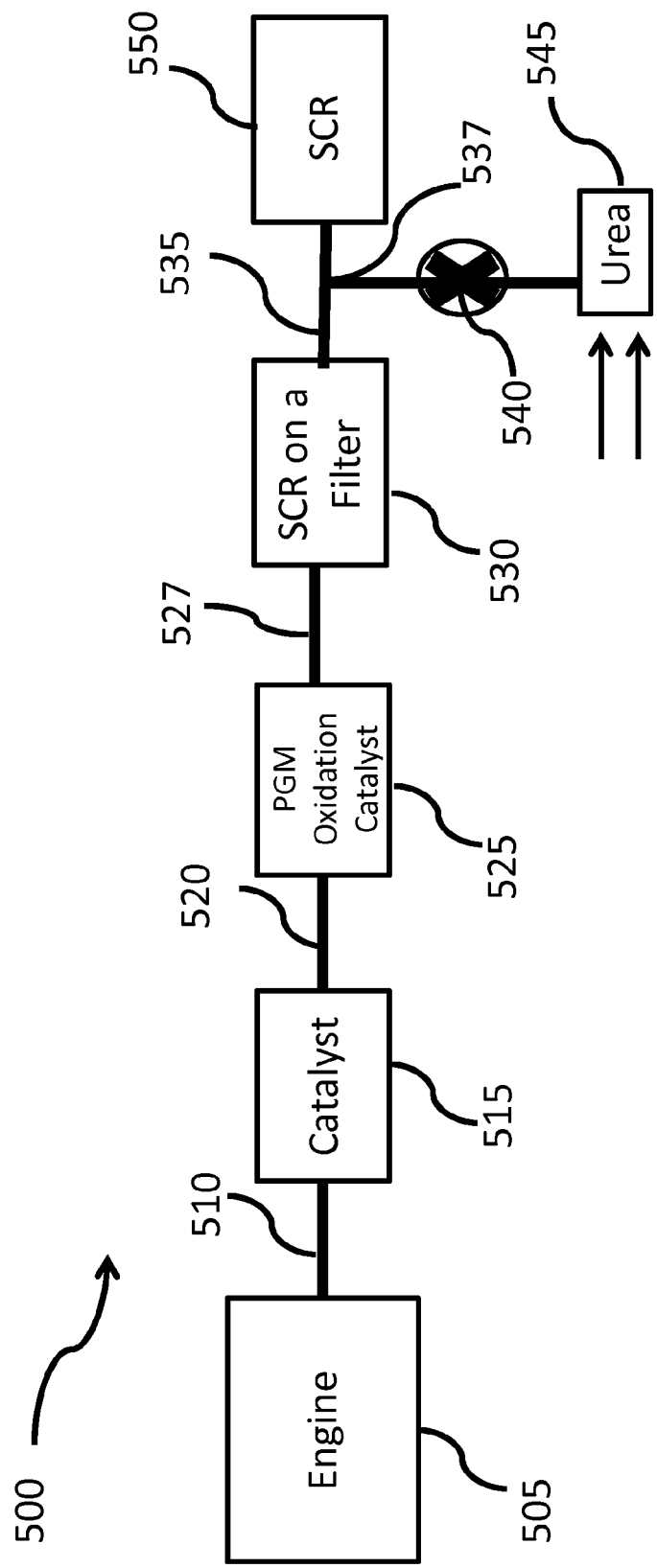
FIG. 11 is a schematic of an engine treatment system according to one or more embodiments.

Another embodiment of the inventive emission treatment system 500 is schematically depicted in FIG. 11. As can be seen in FIG. 11, the exhaust containing gaseous pollutants (including unburned hydrocarbons, carbon monoxide, and $NO_x$) and particulate matter is conveyed from the engine 505 through exhaust gas conduit 510 to the base metal catalyst 515. In the base metal catalyst 515, unburned gaseous and non-volatile hydrocarbons (i.e. the VOF) and carbon monoxide are largely combusted to form carbon dioxide and water. Removal of substantial proportions of the VOF using the base metal catalyst 515 and a diesel oxidation catalyst 525 helps prevent too great a deposition of particulate matter on the soot filter 525 (i.e. clogging), which is positioned downstream in the system. Additionally, substantially no $NO_2$ is generated in the base metal catalyst. For instance, the amount of $NO_2$ entering the base metal catalyst 505 is substantially the same or less than the amount exiting the base metal catalyst 505.

In one or more embodiments, the emission treatment system 500 comprises a soot filter 530 coated with a material effective in the selective catalytic reduction of NO by a reductant (herein, SCR on a filter), e.g. ammonia, disposed downstream of the base metal catalyst 515 and the diesel oxidation catalyst 525. A platinum group metal (PGM) oxidation catalyst (i.e., AMOX, DOC, HC oxidation catalyst, etc.) 525 positioned downstream of the base metal catalyst 515 and upstream of soot filter 530 can oxidize nitrogen oxides, carbon monoxide, hydrocarbons, and $NH_3$ as well, especially in cases where urea is injected in front of the base metal catalyst 515. Exhaust gas flows from the base metal catalyst 515 to the platinum group metal oxidation catalyst 525 via exhaust gas conduit 520, and from the PGM oxidation catalyst 525 to the downstream SCR on a filter 530 via exhaust gas conduit 527. The base metal catalyst 515 is placed in front of the platinum group metal oxidation catalyst 525 to burn fuel in a sulfur rich environment. In one or more embodiments, the oxidation catalyst uses platinum, however only a small amount of platinum is used in order to reduce the costs associated with production of the PGM oxidation catalyst. In one or more embodiments, the amount of platinum used in the range of from 0.5 to 20 $g/ft^3$, including in the range of 1 to 20, 1 to 15, 1 to 10, 2 to 20, 2 to 15, 2 to 10, 3 to 20, 3 to 15, 3 to 10, 4 to 20, 4 to 15, 4 to 10, 5 to 20, 5 to 15, and 5 to 10 $g/ft^3$. In addition, substantially no $NO_2$ is generated in the base metal catalyst. For instance, the amount of $NO_2$ entering the base metal catalyst is substantially the same or less than the amount exiting the base metal catalyst 515.

In specific embodiments, the SCR on a filter 530 has a plurality of longitudinally extending passages formed by longitudinally extending walls bounding and defining said passages. The passages include inlet passages that have an open inlet end and an open outlet end. The wall flow monolith contains an SCR catalyst composition that permeates the walls at a concentration of at least 1.3 $g/in^3$ (and more specifically from 1.6 to 2.4 $g/in^3$). The wall flow monolith has a wall porosity of at least 50% with an average pore size at least 5 microns. In one or more embodiments, an SCR catalyst composition permeates the walls of the wall flow monolith so that the walls have a wall porosity of from 50 to 70% with an average pore size of from 5 to 30 microns. In some embodiments, the SCR catalyst that is coated on the filter comprises a platinum group metal. In other embodiments, the SCR catalyst that is coated on the filter is substantially free of platinum group metal.

The exhaust stream is conveyed to the SCR on a filter 530. On passing through the SCR on a filter 530, the $NO_x$ component is converted through the selective catalytic reduction of NOx with ammonia to nitrogen.

Depending on the desired level of $NO_x$ removal, additional SCR catalyst 550 can be disposed downstream of the SCR on a filter 530. For example, the additional SCR catalyst 550 may be disposed on a monolithic, honeycomb flow through substrate or ceramic foam substrate downstream of the SCR on a filter 530. Even in these embodiments, the use of the coated SCR soot filter 530 still achieves a reduction in the total volume of catalyst required to meet $NO_x$ reduction goals.

The particulate matter including the soot fraction and the VOF are also largely removed (greater than 80%) by the SCR on a filter 530. The particulate matter deposited on the SCR on a filter 530 is combusted through the regeneration of the filter, which process is also aided by the presence of the SCR catalyst composition. The temperature at which the soot fraction of the particulate matter combusts is lowered by the presence of the catalyst composition disposed on the soot filter.

As illustrated in FIG. 11, an optional reductant, for example ammonia, is injected as a spray via an injector 537 and a nozzle (not shown) into the exhaust gas stream conduit 535 downstream of the SCR on a filter 530. Aqueous urea can serve as the ammonia precursor which can be mixed with air in a mixing station 545. Valves 540 can be used to meter precise amounts of aqueous urea which are converted in the exhaust stream to ammonia.

For the systems of FIGS. 8 through 11, in one or more embodiments, an optional slip oxidation catalyst can be included downstream of the soot filter and the SCR catalyst. In one or more embodiments, the slip oxidation catalyst is an ammonia oxidation catalyst provided downstream of the soot filter and the SCR catalyst to remove any slipped ammonia from the system. In specific embodiments, the AMOX catalyst may comprise a platinum group metal such as platinum, palladium, rhodium, or combinations thereof.

Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

AMOX and/or SCR catalyst composition(s) can be coated on the flow through or wall-flow filter. If a wall flow substrate is utilized, the resulting system will be able to remove particulate matter along with gaseous pollutants. The wall-flow substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Selective Catalytic Reduction Catalysts

Suitable SCR catalyst compositions for use in the system are able to effectively catalyze the reduction of the $NO_x$ component, so that adequate $NO_x$ levels can be treated even under conditions of low load which typically are associated with lower exhaust temperatures. In one or more embodiments, the catalyst article is capable of converting at least 50% of the $NO_x$ component to $N_2$, depending upon the amount of reductant added to the system. In addition SCR catalyst compositions for use in the system are also ideally able to aid in the regeneration of the filter by lowering the temperature at which the soot fraction of the particulate matter is combusted. Another desirable attribute for the composition is that it possesses the ability to catalyze the reaction of $O_2$ with any excess $NH_3$ to $N_2$ and $H_2O$, so that $NH_3$ is not emitted into the atmosphere.

SCR catalyst compositions should resist degradation upon exposure to sulfur components, which are often present in diesel exhaust gas compositions and should have an acceptable hydrothermal stability in line with the required regeneration temperatures.

Suitable SCR catalyst compositions are described, for instance, in U.S. Pat. No. 5,300,472 (the '472 patent), U.S. Pat. No. 4,961,917 (the '917 patent) and U.S. Pat. No. 5,516,497 (the '497 patent), which are hereby incorporated by reference in their entirety. Compositions disclosed in the '472 patent include, in addition to titanium dioxide, at least one oxide of tungsten, silicon, boron, aluminum, phosphorus, zirconium, barium, yttrium, lanthanum, or cerium, and at least one oxide of vanadium, niobium, molybdenum, iron, or copper. Compositions disclosed in the '917 patent include one or both of an iron and a copper promoter present in a zeolite in an amount of from about 0.1 to 30 percent by weight, a specific example being from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

Reductant Injector

A reductant dosing system is optionally provided downstream of the soot filter and upstream of the SCR catalyst to inject a $NO_x$ reductant into the exhaust stream. As disclosed in U.S. Pat. No. 4,963,332, $NO_x$ upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Additional aspects are directed to methods of treating an exhaust stream from a diesel engine comprising $NO_x$ and particulate matter. In one or more embodiments, the method comprises flowing the exhaust stream through the base metal catalyst of one or more embodiments.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Comparative

A standard diesel oxidation catalyst was prepared using a 12"×6" cylindrically shaped substrate with 400 cells per square inch and 4 mil wall thickness. The substrate was coated with a washcoat having 20 g Pt/ft$^3$. The catalyst volume was 11.1 liter.

Example 2

A base metal catalyst was prepared using a 2×10.5"×4.5" cylindrically shaped substrate with 300 cells per square inch and 5 mil wall thickness. The substrate was coated with a washcoat having 0 g Pt/ft$^3$ and a total washcoat loading of 3 g/in$^3$. The washcoat comprises vanadium ($V_2O_5$, 2.5 wt. %) on oxides of tungsten ($WO_3$, 9-10 wt. %)/titania. The catalyst volume was 12.77 liter.

Figure 12:
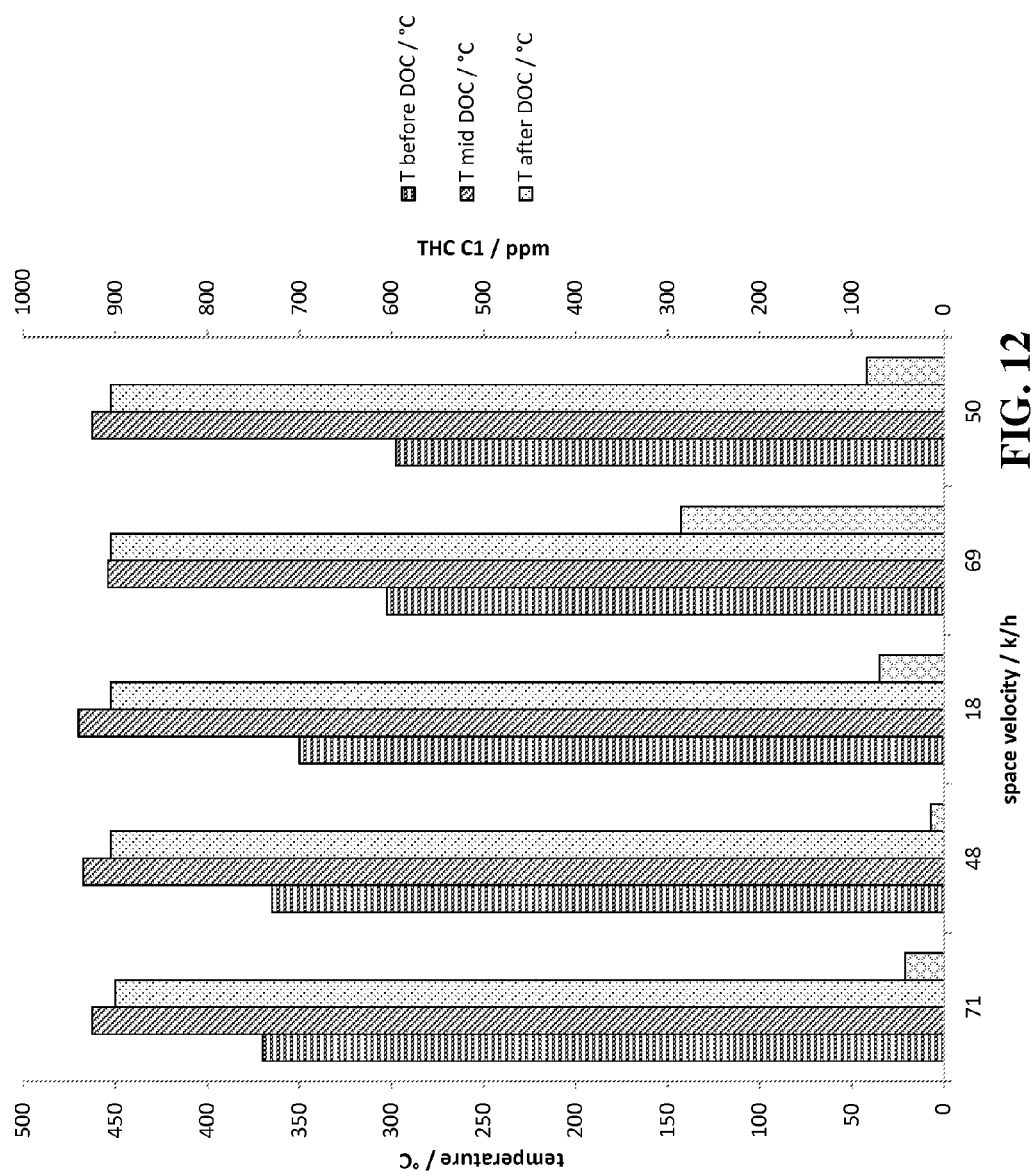
FIG. 12 is a bar graph of fuel burning behavior for a catalyst according to the Examples.

The fuel burning results are presented in FIGS. 7 and 8, and in Table 1. FIG. 7 shows a bar graph with the results of a fuel burning experiment for the comparative catalyst of Example 1. Fuel was injected at different catalyst inlet temperatures and different exhaust mass flows under realistic conditions. The fuel flow was adjusted in a way that 450° C. outlet temperature was reached. The amount of fuel not totally oxidized was measured downstream of the catalyst. In FIG. 12, the first column for each space velocity corresponds to the temperature before the catalyst, the second column corresponds to the temperature mid-catalyst, the third column corresponds to the temperature after-catalyst, and the front (fourth) column corresponds to the total hydrocarbon (HC) slip.

Figure 13:
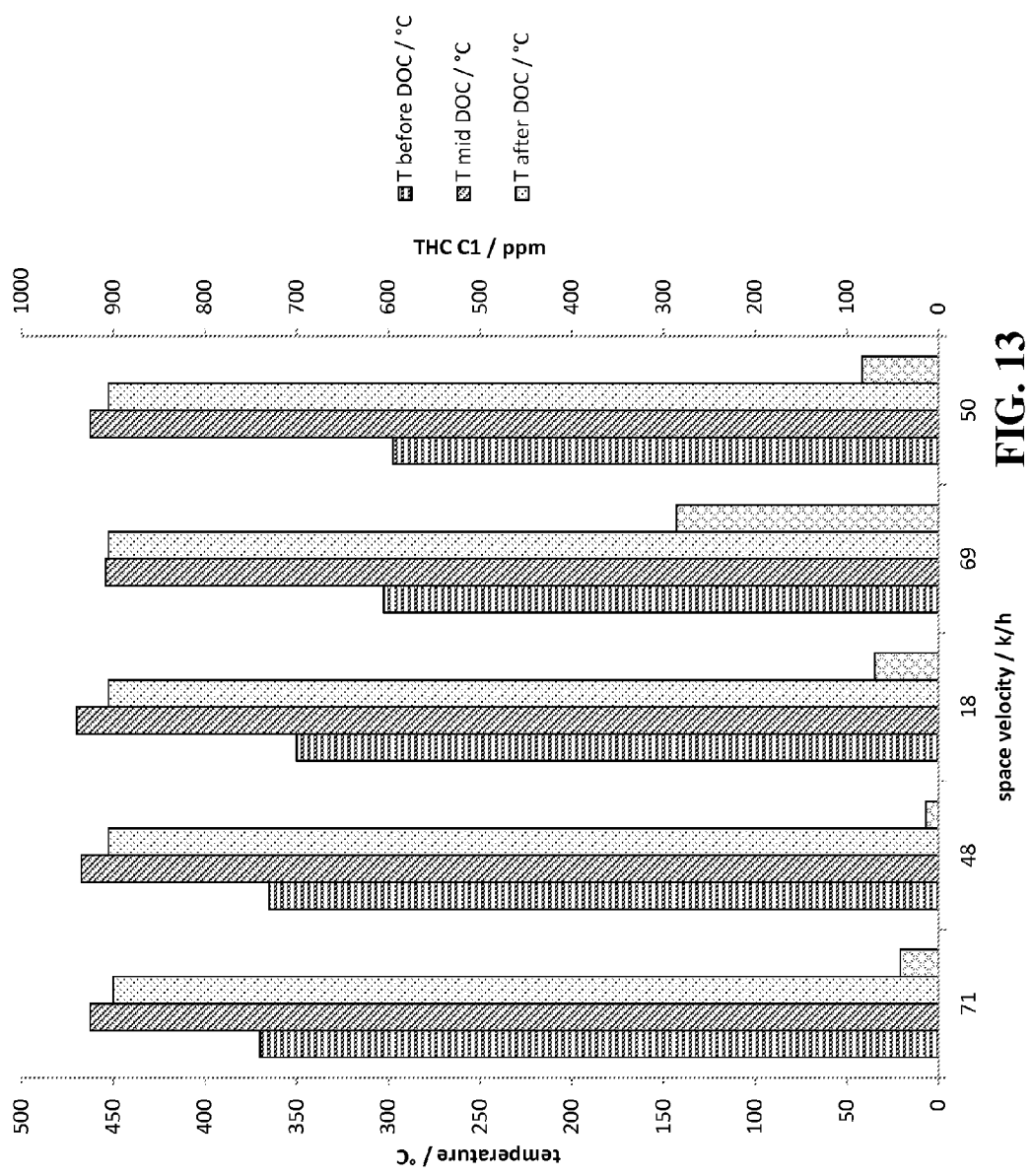
FIG. 13 is a bar graph of fuel burning behavior for a catalyst according to the Examples.

FIG. 13 shows a bar graph of the fuel burning experiment for the catalyst of Example 2. Fuel was injected at different catalyst inlet temperatures and different exhaust mass flows under realistic conditions. The fuel flow was adjusted in a way that 450° C. outlet temperature was reached. The amount of fuel not totally oxidized was measured downstream of the catalyst. In FIG. 13, the first column for each space velocity corresponds to the temperature before the catalyst, the second column corresponds to the temperature mid-catalyst, the third column corresponds to the temperature after-catalyst, and the front (fourth) column corresponds to the total hydrocarbon (HC) slip.

When comparing the graphs of FIGS. 12 and 13, it is clear that the base metal catalyst of Example 2 generates an exotherm by burning fuel over the catalyst, thus producing a favorable temperature for regeneration of a particulate filter. Compared to the catalyst of Example 1, the performance is on a similar level. The target temperature of 450° C. in this experiment was reached, and the amount of fuel not totally oxidized was only slightly higher. The light off temperature is acceptable as well. The observed performance is adequate to use the fuel burning properties of the Example 2 catalyst for soot conversion.

TABLE 1

Fuel Burning Experiments

| Sample | SV (k/h) | Total HC_2000 (ppm) | Temperature Before-Catalyst (° C.) | Temperature Mid-Catalyst (° C.) | Temperature After-Catalyst (° C.) |
|---|---|---|---|---|---|
| Example 1 | 71 | 44.7 | 371.0 | 460.6 | 450.0 |
|  | 48 | 17.8 | 365.3 | 466.1 | 451.2 |
|  | 18 | 6.9 | 349.8 | 469.4 | 450.3 |
|  | 69 | 288.3 | 302.8 | 452.3 | 451.0 |
|  | 50 | 81.2 | 298.3 | 460.3 | 450.4 |
| Example 2 | 62 | 296.8 | 358.1 | 425.2 | 448.8 |
|  | 42 | 176.6 | 371.3 | 429.4 | 449.0 |
|  | 15 | 0 | 402.6 | 452.3 | 450.5 |
|  | 60 | 924.3 | 399.9 | 380.6 | 447.4 |
|  | 44 | 408.1 | 392.3 | 401.1 | 448.9 |

All references, including publications, patent applications, and patents, cited herein are hereby incorporated by reference for all purposes to the same extent as if each reference were individually and specifically indicated to be incorporated by reference and were set forth in its entirety herein.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A base metal catalyst for abatement of exhaust gas emissions from a lean burn engine comprising:
   a base metal material in an amount effective to generate an exotherm upon the introduction of combustible matter to actively and periodically regenerate a downstream particulate filter containing accumulated soot collected by the downstream particulate filter, the exotherm generating heat to provide a temperature range of 300° C. to 650° C. in front of the downstream particulate filter, wherein the base metal catalyst is substantially free of platinum group metals.

2. The base metal catalyst of claim 1, wherein the exhaust gas emissions comprise sulfur and the combustible matter comprises diesel fuel.

3. The base metal catalyst of claim 1, wherein the base metal material is selected from V, W, Ti, Cu, Fe, Co, Ni, Cr, Mn, Nd, Ba, Ce, La, Pr, Mg, Ca, Zn, Nb, Zr, Mo, Sn, Ta, Ce, and Sr, and combinations thereof.

4. The base metal catalyst of claim 3, wherein the base metal material comprises one or more of V, W, Fe, Ce, Cu, and Ti.

5. The base metal catalyst of claim 1, further comprising a molecular sieve material.

6. The base metal catalyst of claim 5, wherein the molecular sieve material has a framework of silicon, aluminum, and/or phosphorus atoms.

7. The base metal catalyst of claim 5, wherein the molecular sieve material comprises ring sizes of no larger than 12.

8. The base metal catalyst of claim 7, wherein the molecular sieve material comprises a d6r unit.

9. The base metal catalyst of claim 8, wherein the molecular sieve material is selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

10. The base metal catalyst of claim 9, wherein the molecular sieve material is selected from AEI, CHA, AFX, ERI, KFI, LEV, and combinations thereof.

11. The base metal catalyst of claim 10, wherein the molecular sieve material is selected from AEI, CHA, and AFX.

12. The base metal catalyst of claim 5, wherein the molecular sieve material comprises a d6r unit, and the base metal material is selected from Cu, Fe, and combinations thereof.

13. The base metal catalyst of claim 11, wherein the molecular sieve material comprises CHA and the base metal material is selected from Cu, Fe, and combinations thereof.

14. The base metal catalyst of claim 1, wherein the base metal catalyst is dispersed on a refractory metal oxide support.

15. The base metal catalyst of claim 14, wherein the base metal catalyst is in a configuration selected from uniform, zoned, or layered.

16. A system for treatment of a lean burn engine exhaust gas stream including hydrocarbons, carbon monoxide, and other exhaust components, the system comprising
an exhaust conduit in fluid communication with the lean burn engine via an exhaust manifold;
the base metal catalyst of claim 1 disposed on a carrier substrate; and
a particulate filter and a first SCR catalyst located downstream from the base metal catalyst.

17. The system of claim 16, wherein a second SCR catalyst is coated onto the particulate filter located downstream from the base metal catalyst.

18. The system of claim 16, further comprising a platinum group metal (PGM) oxidation catalyst downstream from the base metal catalyst and upstream from the particulate filter.

19. The system of claim 18, wherein the base metal catalyst and the platinum group metal (PGM) oxidation catalyst are located on a single substrate.

20. The system of claim 18, wherein the base metal catalyst and the platinum group metal (PGM) oxidation catalyst are located on separate substrates.

21. The system of claim 19, wherein the base metal catalyst and the platinum group metal are layered on the substrate.

22. The system of claim 19, wherein the base metal catalyst and the platinum group metal are axially zoned on the substrate.

23. The system of claim 20, wherein the platinum group metal (PGM) oxidation catalyst comprises an ammonia oxidation catalyst, and wherein the system further comprises a reductant injector downstream of the engine and upstream of the base metal catalyst.

24. The system of claim 17, further comprising a reductant injector downstream of the particulate filter.

25. The system of claim 16, wherein fuel is injected upstream from the base metal catalyst and the fuel comprises sulfur.

26. The system of claim 25, wherein the fuel comprises less than 10 ppm of sulfur.

27. The system of claim 25, wherein the fuel comprises greater than 10 ppm sulfur.

28. The system of claim 16, wherein there is no platinum group metal oxidation catalyst upstream from the base metal catalyst or upstream from the SCR catalyst.

29. The system of claim 16, further comprising an ammonia oxidation catalyst downstream from the particulate filter and the first SCR catalyst.

30. A method of treating an exhaust stream from a diesel engine comprising $NO_x$, particulate matter, and combustible matter, the method comprising:
flowing the exhaust stream through a base metal catalyst comprising a base metal material, thereby combusting at least some of the combustible matter, generating an exotherm of 300° C. to 650° C. in front of a downstream particulate filter containing accumulated soot and actively and periodically regenerating the downstream particulate filter,
wherein the base metal catalyst is substantially free of platinum group metals.

31. The method of claim 30, wherein the combustible matter comprises an unburned gaseous hydrocarbon, a non-volatile hydrocarbon, carbon monoxide, or any combination thereof, and wherein combusting at least some of the combustible matter forms carbon dioxide and water.

32. The method of claim 31, further comprising flowing the exhaust stream through the downstream particulate filter and a first SCR catalyst downstream from the base metal catalyst,
wherein flowing the exhaust stream through the first SCR catalyst reduces NO and/or $NO_2$ to $N_2$.

* * * * *